United States Patent [19]

Quevedo Del Rio

[11] Patent Number: 4,795,171

[45] Date of Patent: Jan. 3, 1989

[54] SELF-PRESSURIZED SHAFT OR CLOSURE SEAL

[76] Inventor: Federico Quevedo Del Rio, Joaquin Cayon No. 6, Santander, Spain

[21] Appl. No.: 107,595

[22] Filed: Oct. 13, 1987

Related U.S. Application Data

[63] Continuation-in-part of Ser. No. 902,866, Sep. 2, 1986, abandoned.

[51] Int. Cl.[4] ............................................. F16J 15/26
[52] U.S. Cl. .................................................. 277/106
[58] Field of Search ...................... 277/112, 105, 106

[56] References Cited

U.S. PATENT DOCUMENTS

| | | | |
|---|---|---|---|
| 50,541 | 10/1865 | Duterne | 277/105 |
| 347,277 | 8/1886 | Price et al. | 277/102 |
| 662,249 | 11/1900 | Cadman | 277/105 |
| 795,444 | 7/1905 | Kales | 277/105 X |
| 860,035 | 7/1907 | Kerr | 277/105 |
| 1,834,190 | 12/1931 | Timbs | 277/105 X |
| 1,988,442 | 7/1932 | Begg | 277/105 X |
| 1,995,395 | 3/1935 | Mohr | 277/112 |
| 2,014,480 | 9/1935 | Martin | 277/105 X |
| 2,069,013 | 1/1937 | Nordstrom | 277/105 X |
| 2,282,502 | 5/1942 | Suth | 277/112 |
| 3,192,942 | 7/1965 | Manor et al. | 277/105 X |
| 3,351,350 | 11/1967 | Shepler | 277/58 |
| 3,540,740 | 11/1970 | Smith | 277/105 X |
| 3,608,912 | 9/1971 | Templin et al. | 277/123 |
| 4,068,853 | 1/1978 | Schnitzler | 277/102 |
| 4,127,310 | 11/1978 | Werner | 277/105 X |
| 4,157,835 | 6/1979 | Kahle et al. | 277/102 |
| 4,174,843 | 11/1979 | Arena et al. | 277/74 X |
| 4,299,395 | 11/1981 | Reed | 277/112 |
| 4,408,769 | 10/1983 | Wolff | 277/105 |
| 4,480,841 | 11/1984 | Schukei et al. | 277/1 |
| 4,500,092 | 2/1985 | Uomala et al. | 277/12 |
| 4,582,329 | 4/1986 | Stalph | 277/106 |
| 4,611,813 | 9/1986 | Guerrero | 277/1 |

FOREIGN PATENT DOCUMENTS

| | | | |
|---|---|---|---|
| 75464 | 2/1919 | Austria | 277/60 |
| 903742 | 6/1972 | Canada . | |
| 926435 | 5/1973 | Canada . | |
| 1475892 | 2/1969 | Fed. Rep. of Germany | 277/105 |
| 27700 | 12/1902 | United Kingdom . | |
| 331013 | 6/1930 | United Kingdom | 277/106 |
| 504521 | 4/1939 | United Kingdom . | |
| 753408 | 7/1956 | United Kingdom . | |
| 2055160A | 2/1981 | United Kingdom . | |
| 2066906 | 7/1981 | United Kingdom | 277/106 |

OTHER PUBLICATIONS

Fisher Controls Valve Schematics (1 Page).
"Packing and Seals", Power Magazine, Aug. 1984, (pp. S8,S9).
A. R. Freeman, "Gaskets for High-Pressure Vessels", Mechanical Engineering Magazine (1952, pp. 165-168).

Primary Examiner—Donald A. Griffin
Attorney, Agent, or Firm—Chilton, Alix & Van Kirk

[57] ABSTRACT

A pressurized fluid housing (4) has an opening (6) for receiving a movable shaft or stem (2). A hold down plate or bonnet (8) covers the opening and has an aperture (14) through which the shaft enters the housing. The hold down plate further includes a rigid, annular shoulder (34), facing downward, adjacent the shaft. A pressure plate or gland (18) is located within the opening and below the hold down plate. The pressure plate has an aperture (24) through which the shaft passes, and an upward-facing annular shoulder portion (40) adjacent the shaft and opposed to the shoulder on the hold down plate. An annular space (54) between the hold down plate and the pressure plate is maintained at ambient pressure through channels (16). The system pressure is imposed agains the lower surface (22) of the pressure plate to compress a packing ring (28) between the shoulders of the pressure plate and the hold down plate, thereby producing a radial pressure to seal the ring against the shaft. A variety of embodiments are shown, including arrangements for closing a vessel opening where no penetrating shaft or stem is present.

61 Claims, 26 Drawing Sheets

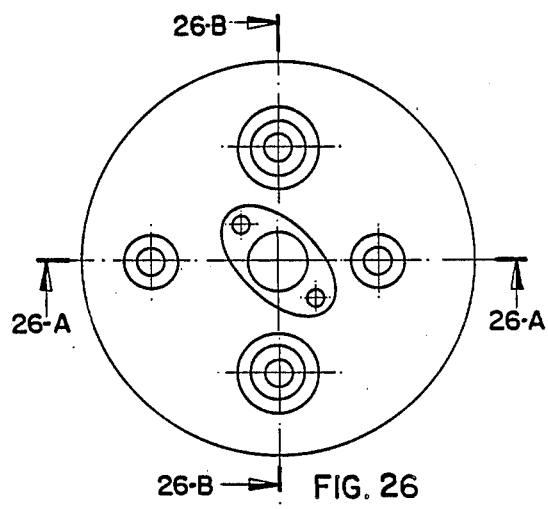
FIG. 26
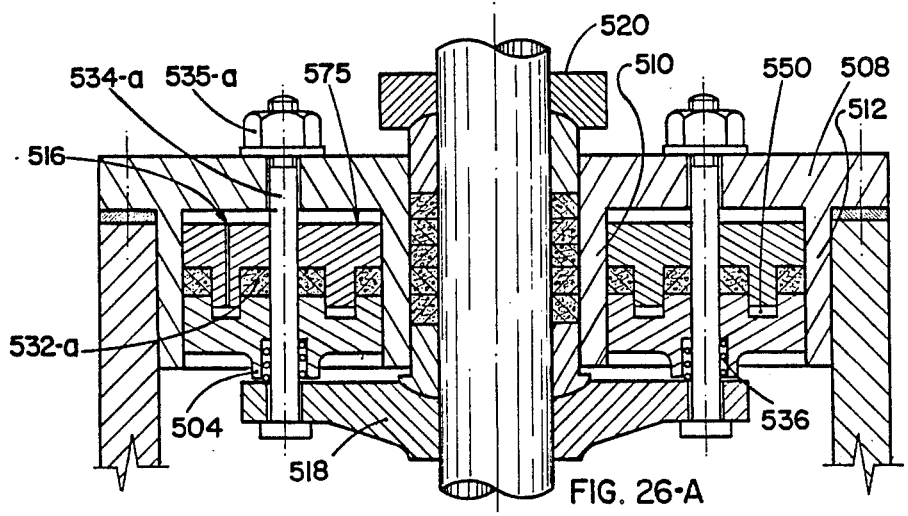
FIG. 26-A
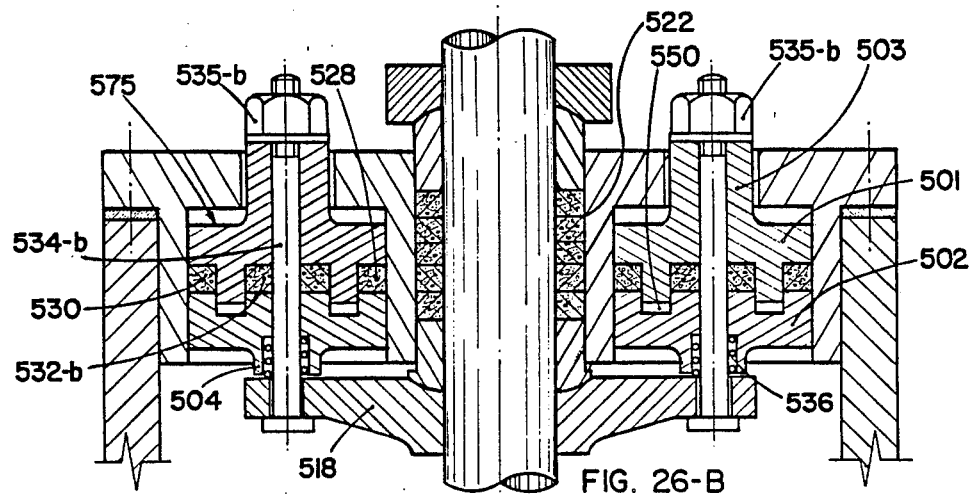
FIG. 26-B

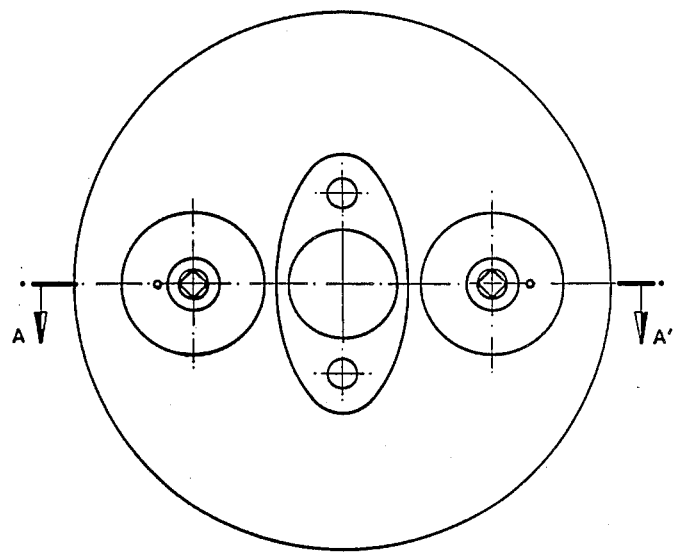
FIG. 27
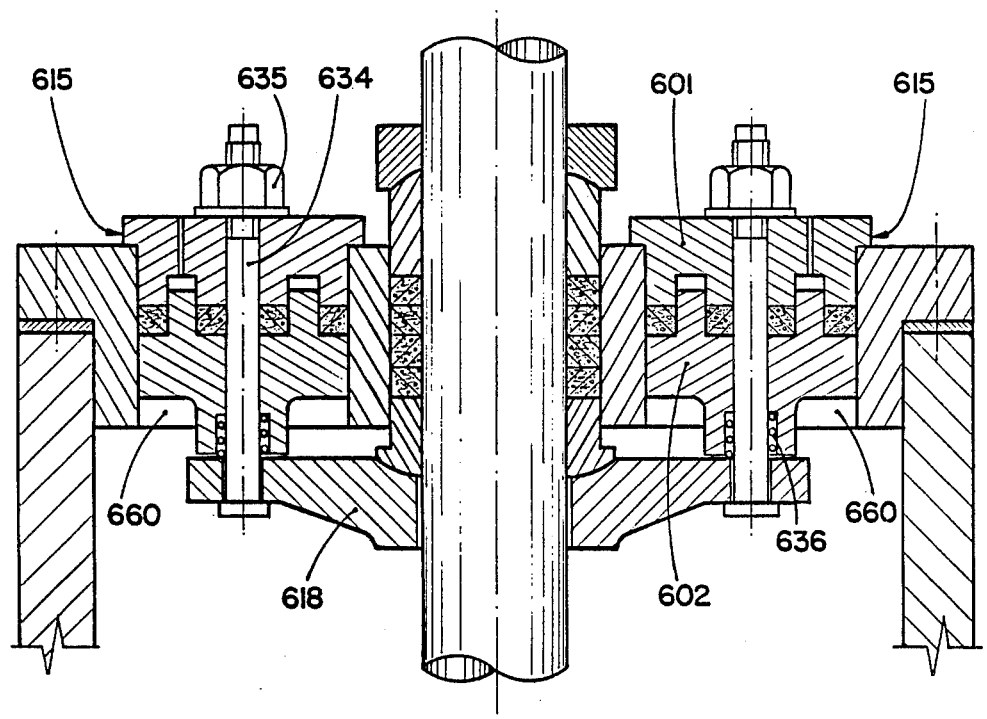
FIG. 27-A

SELF-PRESSURIZED SHAFT OR CLOSURE SEAL

This application is a continuation-in-part of application Ser. No. 902,866 filed Sept. 2, 1986 and now abandoned.

BACKGROUND OF THE INVENTION

This invention relates to fluid handling equipment, and more particularly to arrangements for sealing closures for pressure vessels, valves and pumps.

In fluid handling equipment such as valves and pumps, it is common for a stem or shaft to penetrate the fluid housing in order to accomplish the movement of internal closures or pieces to control the pressure or flow, for example. To accommodate the movement of the stem, clearance must be provided between the stem and the aperture through which it penetrates the housing. To avoid leakage of pressurized fluid from within the housing, it is well known to provide a resilient physical barrier, or packing, between the stem and the portion of the housing or closure member that defines the aperture for the stem.

In a valve of conventional design, the packing is located in a stuffing box surrounding the stem or shaft, and a collar or external gland is mounted in the valve bonnet for compressing the packing in the stuffing box. The collar is typically torqued to apply a high axial force at the upper end of the packing, in order to produce sufficient radial force at the lower end of the packing so that the radial pressure of the packing against the stem is greater than the system pressure within the housing.

The conventional technique for assuring adequate safety margin against fluid leakage through the packing, has been to provide an elongated stuffing box containing additional layers of packing rings or the like. The extra layers of packing require an increase in the axial pressure applied by the collar to achieve the required radial pressure at the lower end of the packing, against the stem. This technique is only marginally effective, in that the higher the stack of packing material along the shaft, the greater the accumulation of friction between the packing and the stem. The fraction of axial pressure applied at the upper end of the stuffing box, that ultimately is manifested as radial pressure against the stem at the lower end of the packing, is greatly diminished. Moreover, the very high axial pressures required on the packing in order to achieve the desired radial sealing pressure at the lower end of the packing, produce radial pressures at the upper end of the packing that can lead to overstressing of the packing rings, high stem loads, and even stem wear and binding. This leads in many cases to rapid packing wear and inconsistent gland-load maintenance Furthermore, the size and strength of the closure components and tightening devices, as well as the motors and actuators for the stem or shaft, must be designed with a very high over capacity relative to the system pressure.

SUMMARY OF THE INVENTION

It is an object of the present invention to provide an arrangement for sealing the penetration of a shaft or stem into a pressure housing of a valve, pump or the like, such that for a given system pressure, the maximum axial and radial stresses experienced by the packing, stem, and related components are significantly reduced relative to known techniques.

It is another object to promote such an arrangement in which the potential wear in the shaft packing may be self compensated by the system pressure.

It is a further object to provide such arrangements which can readily be backfit into a wide variety of existing valves, pumps and pressure vessels.

It is yet another object of the invention to provide such an arrangement in combination with a conventional stuffing box arrangement, wherein the benefits of redundancy and on-line packing ring change out may be achieved.

In accordance with one broad aspect of the invention, a pressurized fluid housing has an opening for receiving a movable shaft or stem. A hold down plate or bonnet covers the opening and has an aperture through which the shaft enters the housing. The hold down plate further includes a rigid, annular shoulder, facing downward, adjacent the shaft. A pressure plate or gland is located within the opening and below the hold down plate. The pressure plate has an aperture through which the shaft passes, and an upward-facing annular shoulder portion adjacent the shaft and opposed to the shoulder on the hold down plate. With the present invention, the system pressure is imposed against the lower surface of the pressure plate to compress a packing ring between the shoulders of the pressure plate and the hold down plate, thereby producing a radial pressure to seal the ring against the shaft.

The present invention thus introduces a packing gland inside the housing and the system pressure acts upon the gland to achieve the required radial pressure in the lower end of the packing. Sufficient gland sealing force is achieved because the upper side of the gland remains at all times at ambient pressure and the lower side of the gland is exposed to the system pressure, thereby providing a self-pressurized or self-tightening arrangement. Thus, sealing is provided between the bonnet or hold down plate and the gland or pressure plate for maintaining a portion on the upper surface of the pressure plate at ambient pressure, i.e., isolating the surface from the fluid pressure of the housing. In order to assure that, upon initial system pressurization, the upper surface of the pressure plate will be isolated, the only external force which needs to be applied is that required for initial flow of the packing and for greater confidence a small preload is always maintained between the pressure plate and hold down plate.

In a typical implementation of this aspect of the invention for a valve intended for use in a fluid system having a design pressure of 1,000 psi the fluid pressure of the system can easily produce with a gland having appropriate dimensions, an axial pressure on the lower end of the packing n the order of 2,500 psi. The resulting packing radial pressure, with a material such as pure graphite, can be on the order of about 1,200 psi. In many conventional arrangements, a target radial pressure of 1,200 psi for the lower end of the packing would typically require an axial pressure of over 8,000 psi at the upper end of the packing Applicant's invention can thus directly obtain the required packing radial pressure at the lower, or sealing, end of the packing, while significantly reducing the axial and radial pressures at the upper end of the packing.

In its simplest embodiment, this aspect of the invention is implemented by providing a unitary hold down plate or bonnet, which is integrally formed from the housing, or rigidly connected thereto. The pressure plate or pressure gland is located below the hold down plate and slightly preloaded against the packing rings interposed therebetween. The system pressure urges the pressure gland upwardly against the packing rings, which in turn are buttressed by the hold down plate.

In a second embodiment, the hold down plate includes as an inner portion adjacent the shaft, a somewhat conventional collar or external gland, which is independently adjustable against the upper end of the packing surrounding the shaft.

In a third embodiment, a collet or similar cup-shape member having upper and lower shoulder surfaces is rigidly and detachably supported by the bonnet intermediate the pressure gland and the external gland or collar, adjacent the shaft. Two, independently loaded packing rings are provided around the shaft. One is located for compression between the pressure gland and the shoulder of the collet, and the second is located for compression between the exterior gland and the collet. In this embodiment, the primary shaft sealing is accomplished by the lowermost packing between the pressure gland and the collet and the backup seal is provided between the exterior gland and the collet. The exterior gland can be removed and the backup packing periodically checked, while the valve remains on-line at full system pressure. Thus, the primary seal can be checked for leakage by observing the condition of the backup seal.

In general, this aspect of the invention is preferably implemented by including the exterior gland or collar, because in some embodiments it compensates for potential wear in the packing during service, improves the distribution of bulk packing stresses through the stem, and in other embodiments, it can form a part of a backup seal.

In a fourth embodiment an additional feature is introduced. In addition to the internal gland, a collet piston that can self compensate wear in the shaft packing is provided.

In a fifth embodiment a pair of collet pistons are introduced in tandem to self compensate potential wear even in the shaft packing like in the housing-bonnet closure.

In a sixth embodiment the stud member mechanism used in the previously mentioned embodiments has been eliminated by providing an internal set of springs to perform the initial preload in the seal.

In yet a seventh embodiment the function of the collet piston is perform by two annular or piston collars.

It has been further discovered that the principals associated with sealing the stem or shaft of a valve or pump can be adapted for sealing a complete closure of a opening or nozzle in a pressure vessel, even when no shaft or stem penetrates the opening. It is thus another object of the invention to provide a self-pressurized closure for an opening in the pressure vessels such as valve housings, pump cases, or pressure vessel heads.

This is accomplished in accordance with another aspect of the invention, by providing a head assembly rigidly supported by the housing and covering the opening, the head assembly having an exterior surface exposed to the atmosphere and a lower surface exposed to the opening. A gland assembly is disposed within the opening below the head assembly exterior surface, the gland assembly having an upper surface facing the head assembly lower surface and a lower surface exposed to the pressure of the housing. A first packing is encapsulated by the housing wall perimeter defining the opening, a first portion of the head assembly lower surface, and a first portion of the gland assembly upper surface. A second packing is encapsulated by a second portion of the head assembly lower surface and a second portion of the gland assembly upper surface. The first and second packings are interposed between the head assembly and the gland assembly so as to establish an enclosed space between the head assembly lower surface and the gland assembly upper surface, intermediate the first and second packing. Means, such as a pinhole, are provided for communicating ambient pressure from the head assembly exterior surface to the space. Also, the gland assembly is biased to preload the first and second packing agains the head assembly lower surface. In this arrangement, upon pressurization of the housing, a pressure difference develops between the interior surface of the gland assembly and the portion of the gland assembly upper surface defining the space, whereby the gland assembly is urged toward the head assembly and the first and second packing thereby form seals to prevent leakage of fluids.

BRIEF DESCRIPTION OF THE DRAWINGS

The preferred embodiments of the invention will be described below with reference to the accompanying drawings, in which:

FIG. 26 is a sectional view, in side elevation, illustrating a seventh embodiment of the invention by the incorporation of internal piston collars.

FIGS. 26a and 26b are sectional views taken along lines 26a—26a and 26b—26b of FIG. 26, respectively.

FIG. 27 is an elevation view, in section, of a variation of the embodiment shown in FIG. 26.

FIG. 27a is a section view along line AA of FIG. 27.

DESCRIPTION OF THE PREFERRED EMBODIMENTS

Figure 1:
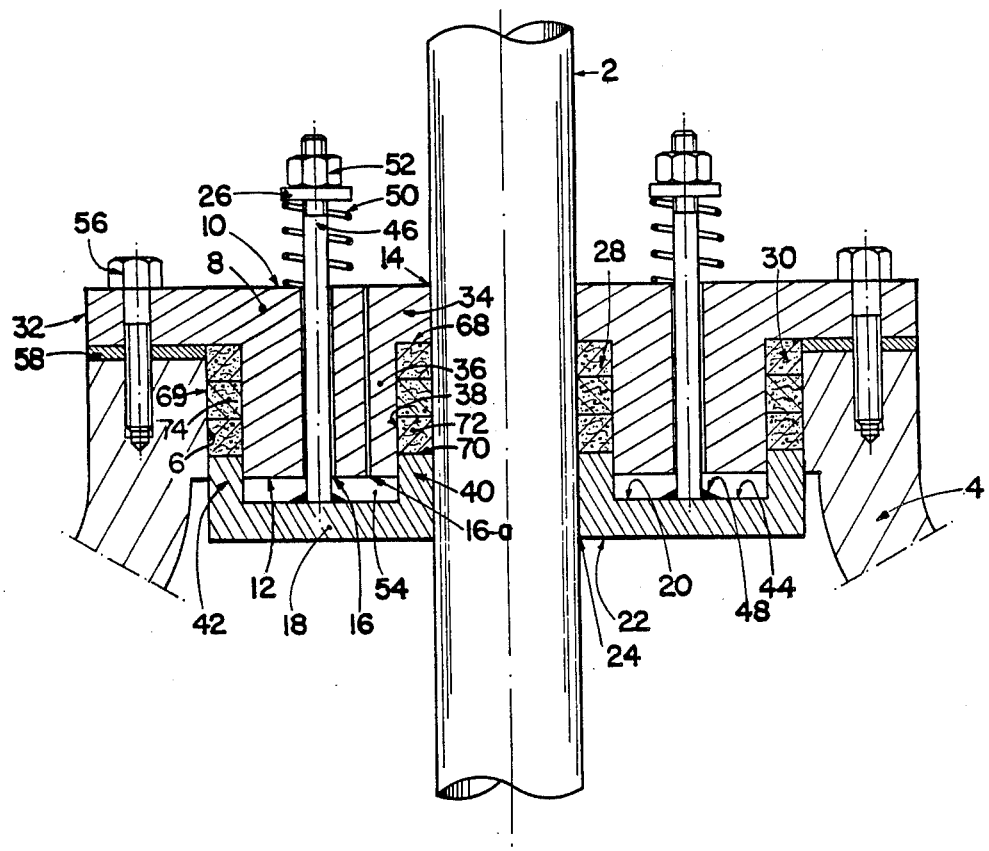
FIG. 1 is an elevation view, in section, through a portion of a valve penetrated by a stem, according to a first embodiment of the invention.

FIG. 1 illustrates a first, basic embodiment of the invention, wherein a valve stem 2 penetrates a valve body or pressure housing 4. In the remainder of the description of the invention, the directions up and down refer to movement or relationships along a line parallel to the axis of the shaft 2, and the directions in and out refer to movement or relationships along a radius transverse to and centered on the axis of the shaft.

A bonnet assembly 8 is rigidly supported by the housing and covers the opening 6. The bonnet assembly has an upper surface 10 and a lower surface 12, and further includes an aperture 14 through which the shaft 2 enters the housing 4. For reasons to be more fully explained below, the bonnet assembly 8 includes a channel 16 or similar path such as a "pin hole" 16a for communicating the ambient pressure on the exterior, or upper surface 10 of the bonnet, to the lower surface 12 of the bonnet.

An internal, or pressure gland assembly 18 is located within the housing 4, coaxially below and spaced from the bonnet assembly 8. The gland assembly 18 has an upper surface 20 including a portion which is spaced from the bonnet lower portion 12 and is in pressure communication with the channel 16. The lower surface 22 of the gland assembly 18 is exposed to the interior of the housing, where the full system pressure will be imposed thereon. The gland assembly 18 further includes an aperture 24 penetrated by the shaft.

A first, or inner packing ring 28 surrounds the shaft 2 and is, in effect, encapsulated by the shaft and portions of the bonnet assembly 8 and the gland assembly 18. Thus, in accordance with a key feature of the invention, the axial stress applied to the packing ring 28 is produced by the system pressure acting on the lower surface 22 of the gland assembly 18 and urging it upwardly against the packing ring 28. The magnitude of the axial pressure applied against the lower surface of the packing ring 28, is determined by the difference of pressure in the projected area between the lower surface 22 and the area of the portion of surface 20 that is maintained at ambient pressure through channel 16. Thus, it is very important that the portion of the upper surface in communication with the ambient atmosphere, be isolated at all times from the system pressure within the housing.

In the illustrated embodiment, this isolation is achieved by providing an outer, second packing means 30, generally concentric with and having a larger diameter than the first ring 28. Preferably, these rings are made from pure graphite, or other resilient or semi-resilient material that is suitable for high pressure sealing applications. The packing rings are located between the bonnet assembly 8 and the gland assembly 18 for axial compression therebetween, to provide a seal against intrusion of the system pressure into the upper surface portion of the gland assembly 18. The first packing ring 28, of course, also provides the function of preventing the leakage of system fluid from the bonnet assembly 18 along the shaft 2.

To assure that the upper surface 20 of the gland assembly 18 will remain isolated from the system pressure under all conditions, it is desirable to preload the seals or packing rings 28, 30 for initial flow into the local voids of the packing grooves and zones, so that, during system pressurization, no system fluid can leak into the gland upper surface. For a greater confidence a spring or Belleville washer arrangement 26 is provided for biasing the gland assembly 18 toward the bonnet assembly 8.

With continued reference to FIG. 1, the embodiment illustrated therein will be described in further detail. The bonnet assembly 8 includes an outer portion 32 supported by the housing 4, an inner portion 34 which includes the first aperture 14, and an intermediate body portion 36 preferably extending coaxially with the shaft 2 and defining a cylindrical wall 38 in lateral contact with the first packing ring 28.

The gland assembly 18 has a substantially flat lower surface 22 and an upper surface having an inner, raised hub 40 that defines the second aperture 24, an outer raised rim 42, and a substantially flat, annular, intermediate portion 44 which defines the upper surface in ambient pressure communication with the channel 16.

The spring structure 26 for biasing the gland assembly preferably includes a plurality of post or stud members 46 rigidly connected, as by weldment 48, to the gland assembly and extending with clearance through the channels 16 or without clearance if there is a "pin hole" 16a, in the body portion 36 of the bonnet assembly Belleville washers or springs 50 and nut/washers 52 are adjustably advanced along the threaded upper portion of the posts or studs 46 to provide the desired preload on the packing rings 28, 30. The hub 40, rim 42 and intermediate portion 44 of the gland member 18 together with the lower surface 12 of the body portion 36 of the bonnet assembly 8 define an annular space 54 that is connected to the channel 16. It should be appreciated that the space 54 need not necessarily be completely annular, so long as the spaces 54 are symmetrically disposed about the axis of the shaft 2.

In the version of the first embodiment illustrated in FIG. 1, the outer portion 32 of the bonnet assembly 8 is rigidly, detachably connected to the housing 4, by means of housing bolts 56. A gasket 58 or the like is conventionally interposed between the mating surfaces of the bonnet assembly and the housing but it is not necessary in this embodiment because the outer packing 30 is performing the sealing. It should be understood, however, that the bonnet assembly 8 can, in other variations of this embodiment, internally contain the outer packing 30 (as, for example, shown in FIG. 8) and then a gasket 50 or the like is necessary, to seal the mating surfaces of bonnet and housing.

Figure 5:
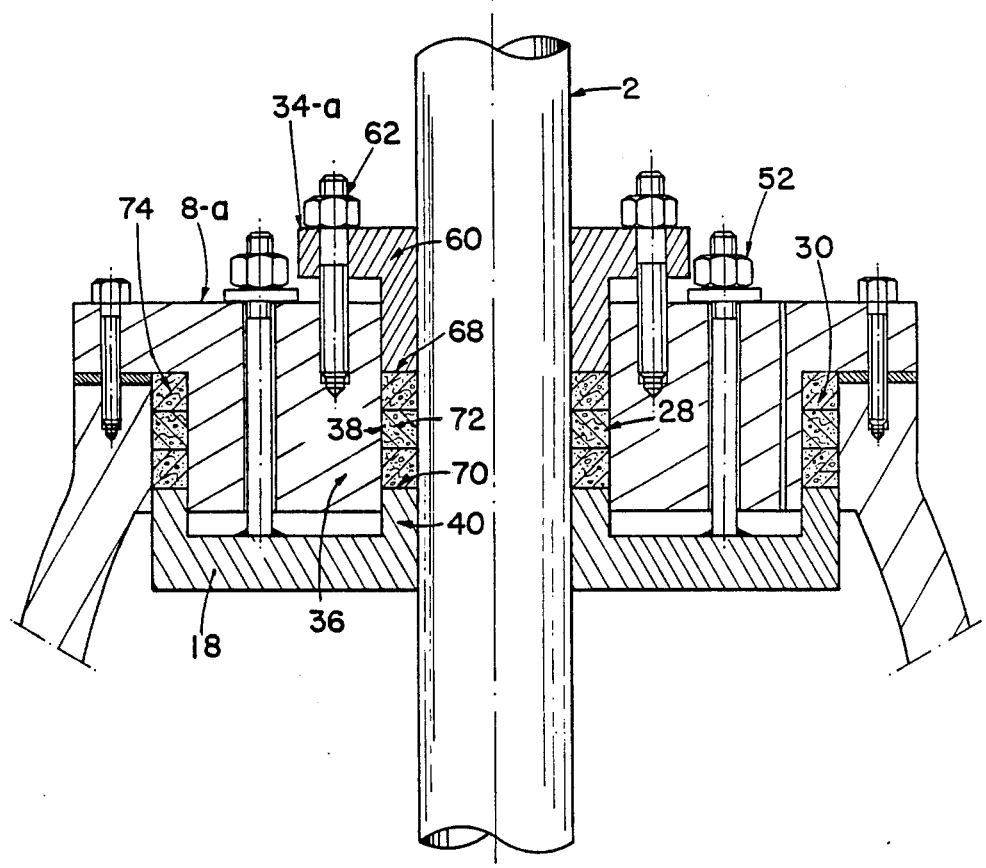
FIG. 5 is an elevation view, in section, of the second embodiment of the invention in a valve.

FIG. 5 illustrates a second embodiment of the invention, wherein the inner portion 34a of the bonnet assembly 8a is in the form of an outer gland or collar 60 that is rigidly and detachably mounted as by collar bolt and nut 62, on the body portion 36. Adjustment of the collar 60 upwardly or downwardly provides a flatter distribution of the bulk stresses to the packing, as will be more fully described below, and can compensate for the potential wear in the first packing ring 28. It should be appreciated that inner packing 28 may wear to some extent, whereas outer packing ring 30 does not contact any moving parts that are likely to produce significant wear. Accordingly, the balancing of the preload can be accomplished on the inner ring by adjustment of the collar 60.

Figure 6:
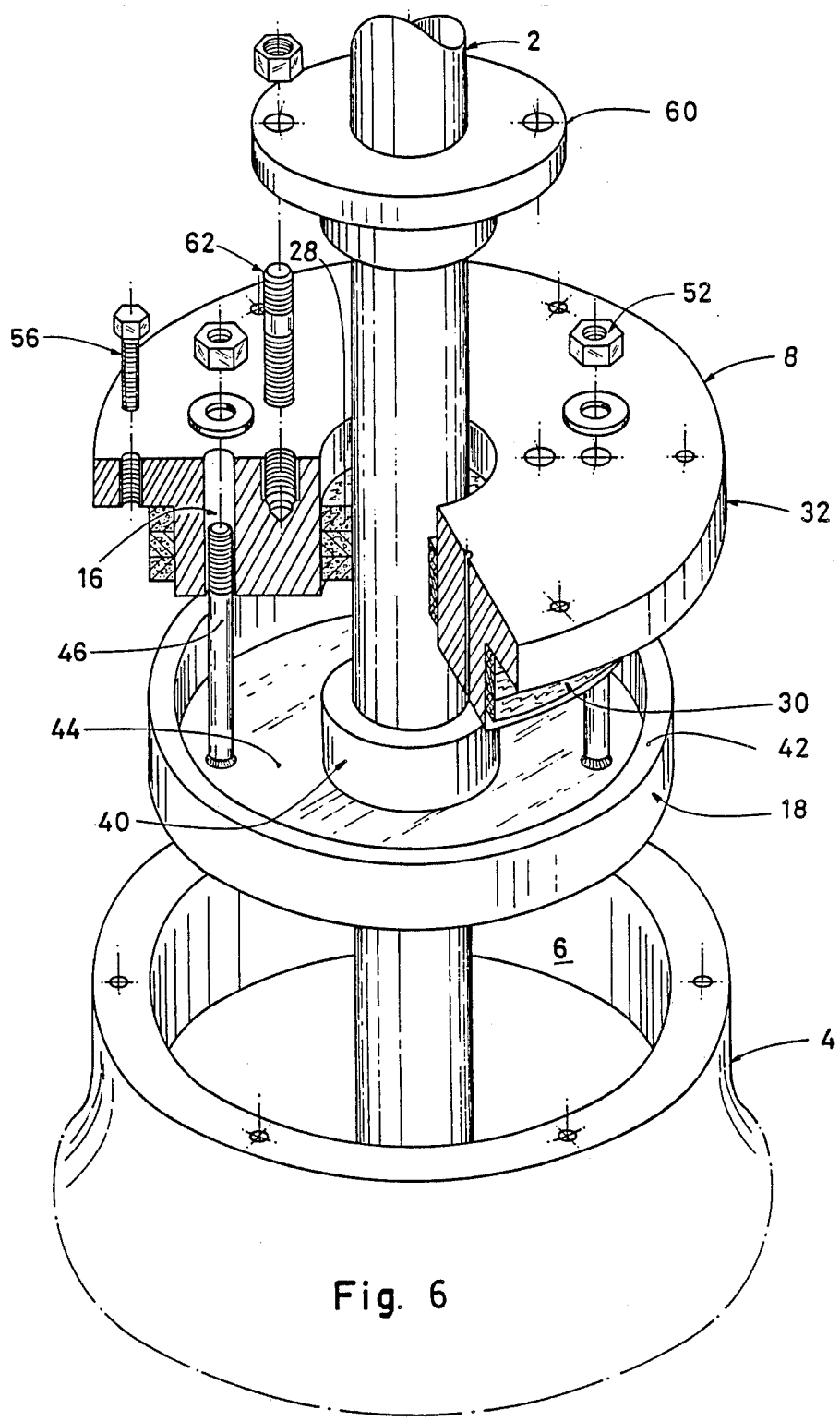
FIG. 6 is an isometric assembly view of the embodiment of the invention shown in FIG. 5.

FIG. 6 shows an isometric, assembly view of the embodiment illustrated in section in FIG. 5. It may be appreciated that the assembly and maintenance of this closure and stem seal arrangement in accordance with the invention, is simple and readily serviceable.

The inner portion 34 of the bonnet assembly 8, whether integrally formed as shown in FIG. 1, or adjustable in the form of a collar 60 as shown in FIG. 5, defines a rigid, annular shoulder 68 on the underside of the bonnet or hold down plate adjacent the shaft 2. The hub 40 on the gland assembly 18 provides an upward facing annular shoulder 70 adjacent the shaft and opposed to the shoulder 68, thereby defining an annular packing region 72 therebetween. The outer packing region 74 contains the outer packing ring 30, which is, in effect, encapsulated by portions of at least the bonnet assembly 8 and the gland assembly 18. In particular, the rim 42 on the gland assembly 18 is in contact with the lower end of the outer packing ring 30. The radially outer surface of the packing ring is in contact with the neck 69 of the housing 4 in the embodiment illustrated in FIG. 1, but in variations of this embodiment, such as shown, for example, in FIGS. 8 and 11, the outer ring 30 need not contact the housing.

In this and similar embodiments, the internal gland 18 should be somewhat rigid in order to permit the adjustable preloading of the packing ring 28 by tightening of the external gland 60. For this reason, the preload on the packing ring 30 is accomplished by tightening nut 52 directly onto bonnet 8a without an intervening spring such as item 50 of FIG. 1.

Figure 2:
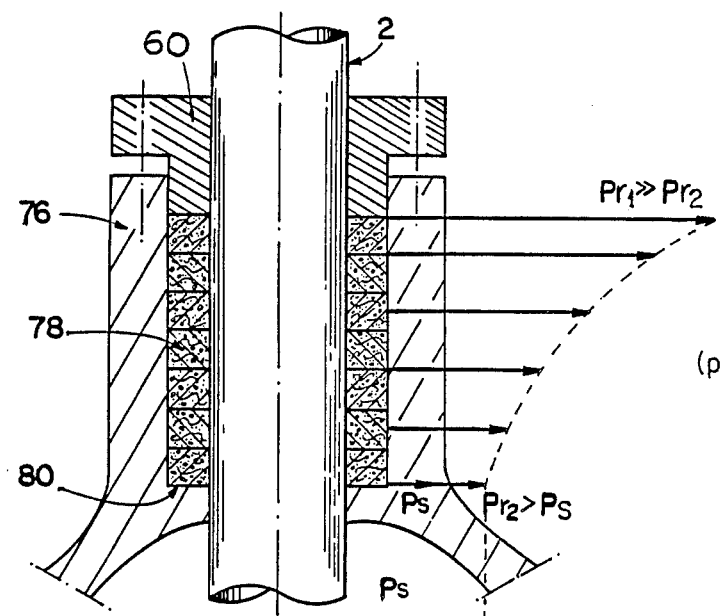
FIG. 2 is an elevation view of a conventional stuffing box, showing the distribution of pressure on the packing rings.

The advantages of the present invention relative to the conventional stuffing box technique for providing a fluid seal along the shaft, will be described with reference to FIGS. 2, 3 and 4. FIG. 2 shows a conventional stuffing box 76 containing packing rings 78 which ar supported at their lower end by integral shoulder 80 and which are compressed at their upper end by external gland 82. It should be understood that in FIGS. 2–4 and 9, the bolts have been deleted for simplicity, but their presence is represented by respective centerlines.

In FIG. 2, the system pressure, for example 1,000 psi, bears upon the lower surface of the packing rings 78. In order to prevent leakage along the stem or shaft 2, the axial pressure supplied by the gland 82 must be large enough to produce a radial pressure along the stem that is greater than the system pressure. In FIG. 2, PS represents system pressure, PR1 represents the radial pressure at the upper end of the packing where it is in contact with the gland 82, and PR2 represents the radial pressure of the packing at the lower end where it is exposed to the system pressure PS. It should be clear that in order to avoid leakage, PR2 must exceed PS, at a position preferably as close to shoulder 80 as possible. In efforts to assure leak-tightness, practitioners in this field have stacked many rings within the stuffing box 76 but due to friction between the packing 78 and the stem 2 and stuffing box, the axial pressure PA required to generate, for example, $PR_2$ of 1,250 psi, can be as high as 8,000 psi. This also produces about 4,000 psi at PR1. The distribution of radial pressure, or stress, on the bonnet 76 and stem 2, is schematically represented by the arrows and dotted lines on FIG. 2.

Figure 3:
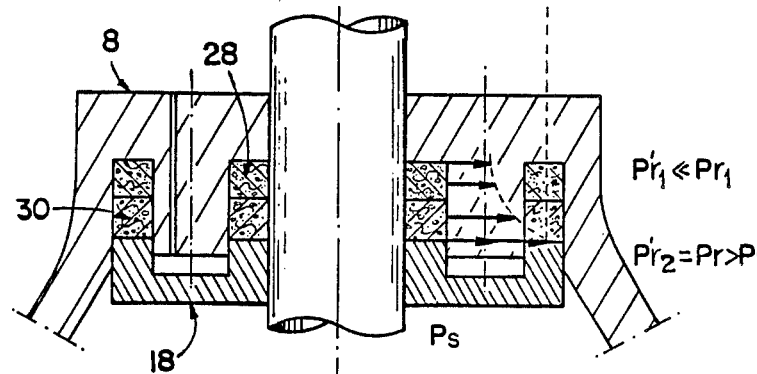
FIG. 3 is a simplified view of the embodiment of the invention shown in FIG. 1, illustrating the pressure distribution for comparison with the conventional stuffing box shown in FIG. 2.

FIG. 3 is representative of the embodiment of the invention illustrated in FIG. 1, wherein the bonnet assembly 8 is not axially adjustable along the shaft. The only loading of the packing rings 28 and 30 is provided by the upward thrust of the gland assembly 18. It can be seen in FIG. 3 that the axial pressure is at a maximum at the interface between the gland assembly 18 and the lower surface of the packing rings 28, 30. This is also the location of the maximum radial pressure P'R2, where the fluid seal is desired. Both the axial and radial pressures diminish in a direction upwardly away from the gland assembly 18.

The advantage of the present invention should be quite evident by comparison of FIGS. 2 and 3. In FIG. 2, the maximum axial and radial pressures are located at the end of the packing opposite where the system pressure is to be resisted, whereas in FIG. 3, the maximum axial and radial pressure are located precisely where the desired resistance to the intrusion of system fluid is desired.

Figure 4:
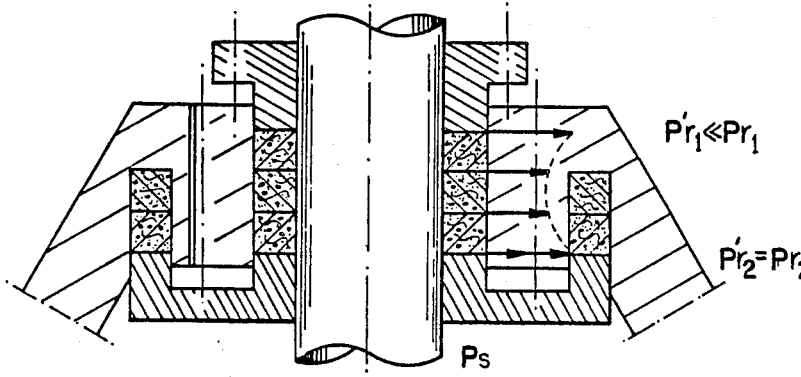
FIG. 4 is a simplified view of a second embodiment of the invention, illustrating the pressure distribution for comparison with FIGS. 2 and 3.
Figure 7:
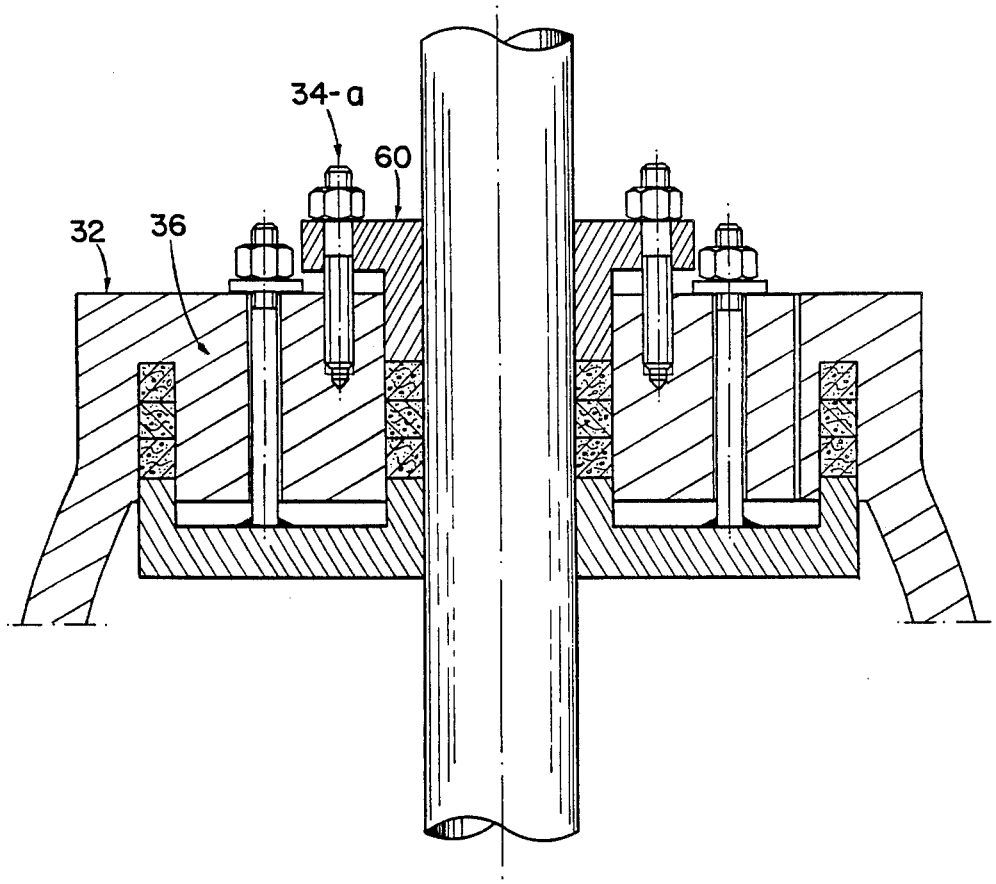
FIG. 7 an elevation view, in section, of a variation of the embodiment of the invention shown in FIG. 5.

In FIG. 4, which represents the embodiment of the invention described with respect to FIGS. 5, 6 and 7, the distribution of the radial pressure is flatter, peaking at the upper and lower ends of the packing ring 28, and having a minimum substantially centered therebetween.

As an example of the sealing pressure available with the present invention, an illustrative calculation will be summarized for a ten inch valve and a system pressure of 1,000 psi. An outer diameter of the gland assembly 18 equal to seven inches, and a diameter of the stem 2 equal to two inches are assumed. Also, the outer diameter of packing ring 28 is assumed to be equal to three inches. The available force to be applied to the lower surface of the gland assembly 18 can thus be computed as follows:

$$F = pA = 1,000 \times \frac{\pi}{4}(7^2 - 2^2) = 35,000 \text{ lbs.}$$

and the resulting axial and radial stresses for packing 28 and 30 are:

$\sigma_a \approx 2,500$ psi (axial packing stress)

$\sigma_r \approx 0.5 \times \sigma_a < 1{,}250$ psi (radial packing stress)

With pure graphite packing rings, the radial stress is approximately one half the axial stress, or about 1,250 psi. This stress is self supplied for the system to seal against the system pressure of 1,000 psi, in contrast with the prior art example mentioned above with respect to FIG. 2, wherein a radial pressure of 1,250 psi was obtained, but at the sufferance of axial stresses of about 8,000 psi and radial stresses of about 4,000 psi at the top of the packing.

Those familiar with this field of technology will immediately appreciate that the required radial pressure at the desired location for sealing against system pressure, coupled with the reduction in maximum axial and radial stresses associated with the bonnet, leads to a simpler, and less costly valve. Furthermore, the maintenance requirements are reduced because the packing does not wear out as quickly, and the stem is less likely to wear or to bind. Furthermore, with respect to implementation in motor operated valves (or pump as described below in connection with FIG. 10), the size of the motor can be considerably reduced at a commensurate cost savings.

Turning now to FIG. 7, a variation of the embodiment shown in FIG. 5 is illustrated, wherein the bonnet outer portion 32 and bonnet intermediate or body portion 36 are integrally formed on the housing and the bonnet inner portion 34 is in the form of a collar 60.

Figure 8:
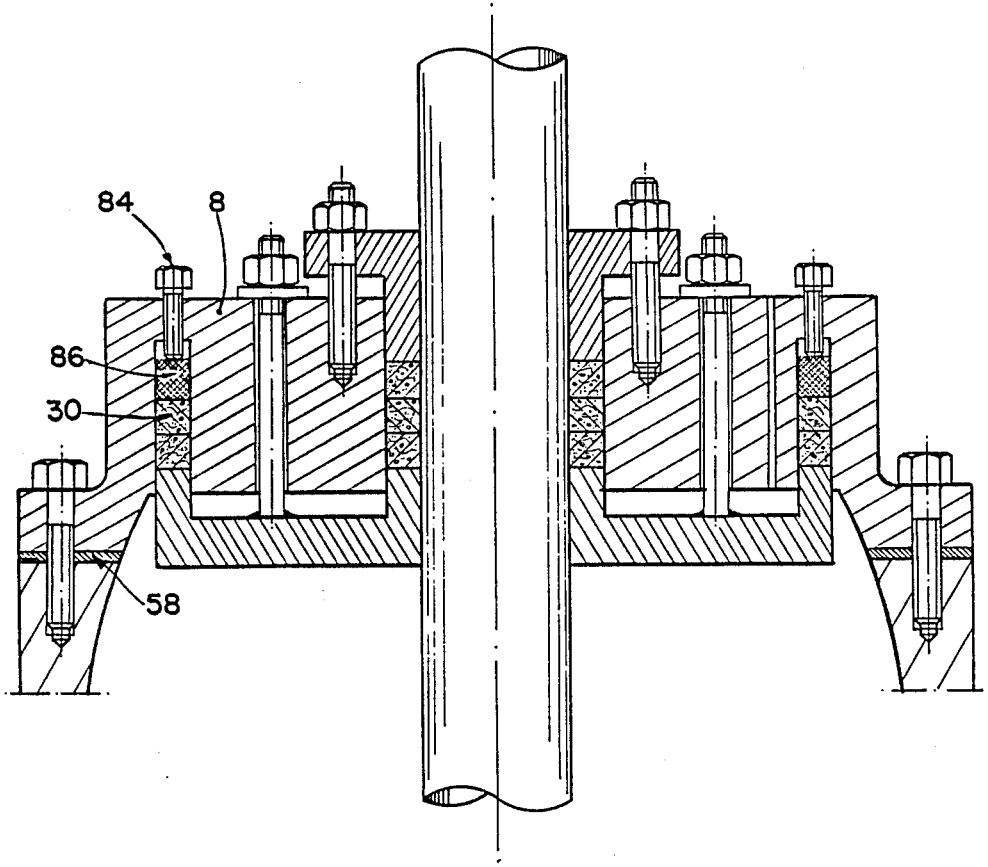
FIG. 8 is an elevation view, in section, of a valve in accordance with a variation of the second embodiment of the invention.

FIG. 8 illustrates another variation of the second embodiment of the invention, having bolts 84 and washer or collar 86, operable from above the bonnet assembly 8, for adjustably preloading the second, or outer packing ring 30.

Figure 9:
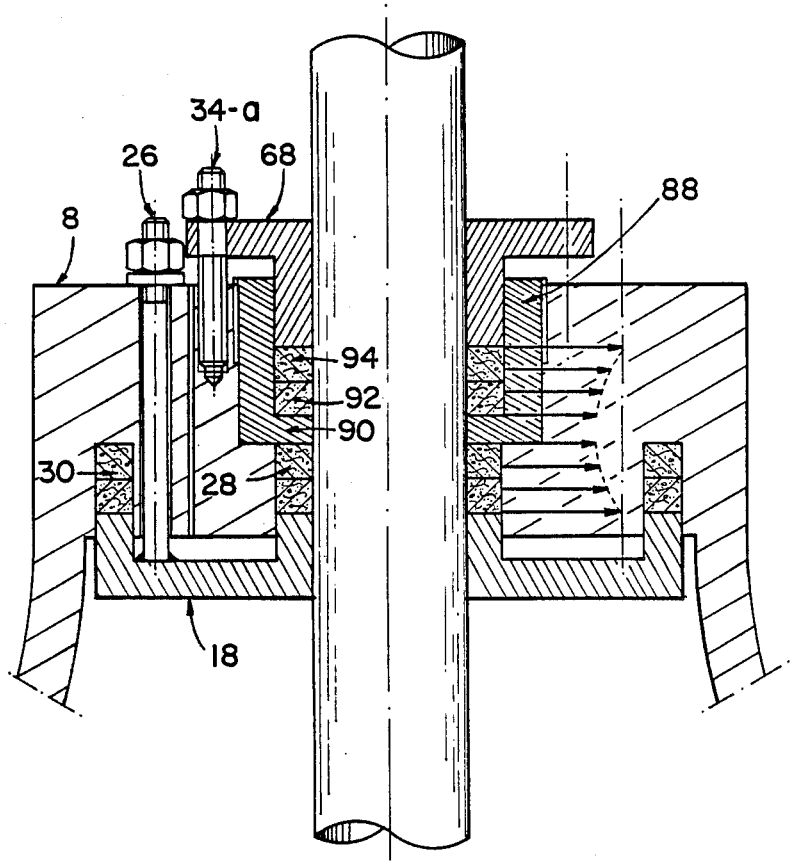
FIG. 9 is an elevation view, in section, of a third embodiment of the invention.

FIG. 9 represents a third embodiment which combines the advantages of the present invention with a backup, or redundant arrangement of conventional construction. In this embodiment, the inner portion 34b of the bonnet assembly 8 includes a generally cup-shaped collet member 88 rigidly supported by the bonnet and including a shoulder portion 90 in contact with the upper end of the first packing ring 28. The inner portion of the bonnet assembly 8 also includes an adjustable collar 68 which in part fits within the collet, and therewith defines a third packing region 92 containing a third packing ring 94 annularly disposed around the shaft and resting on the shoulder 90. In this embodiment, the primary stem seal is provided by the pressure gland 18 bearing upon the primary packing ring 28, and a secondary, or backup seal is provided by the outer, or exterior gland or collar 68 bearing upon the third packing ring 94. The radial pressure distribution along each of these rings is schematically illustrated on the right hand portion of FIG. 9.

It should be appreciated that with the embodiment of FIG. 9, the backup packing 94 may be removed and inspected without disengaging o otherwise diminishing the effectiveness of the primary packing ring 28. During inspection of the packing ring 94, evidence of leakage through the primary packing ring 28 may be observed, in which case a decision can be made to either remove the valve from operation and perform needed maintenance services, or continue operation. Operation for a considerable period of time can be continued by relying on the backup seal 94, since it performs in the same manner as the types of stuffing boxes considered conventional in the art at this time. Replacement of the primary seal 28 can then be performed at the convenience of the plant operator.

Figure 10:
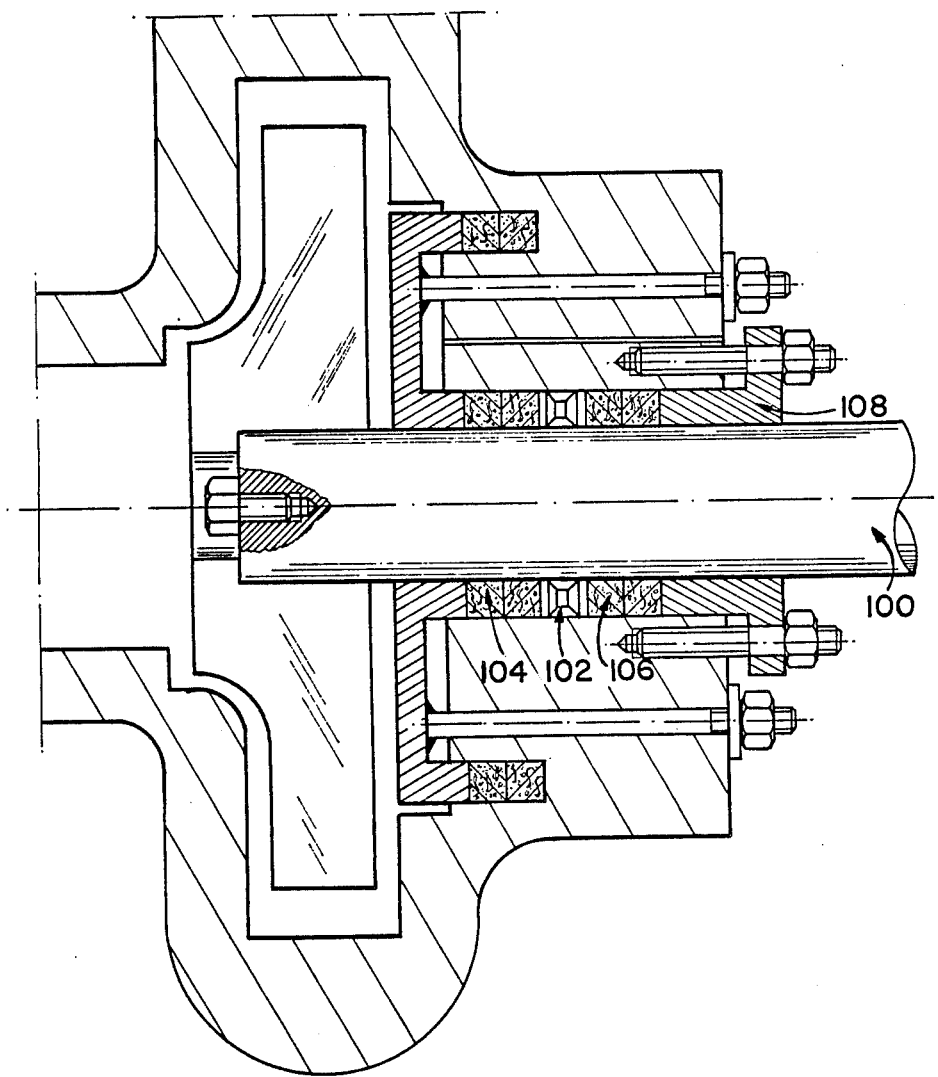
FIG. 10 is an elevation view, in section, of a centrifugal pump in accordance with the invention.

FIG. 10 illustrates the invention embodied in a centrifugal pump wherein the shaft 100 rotates at a high speed as compared with the occasional rotation of stem 2 in the valve embodiment. Typically in pumps of this type, the packing rings are located above and below a lantern ring 102. In many conventional pumps, some fluid leakage around the shaft is allowed in order to dissipate the heat of friction away from the shaft. With the present invention, less heat of friction is generated, so it is not necessary to allow for controlled leakage.

Figure 11:
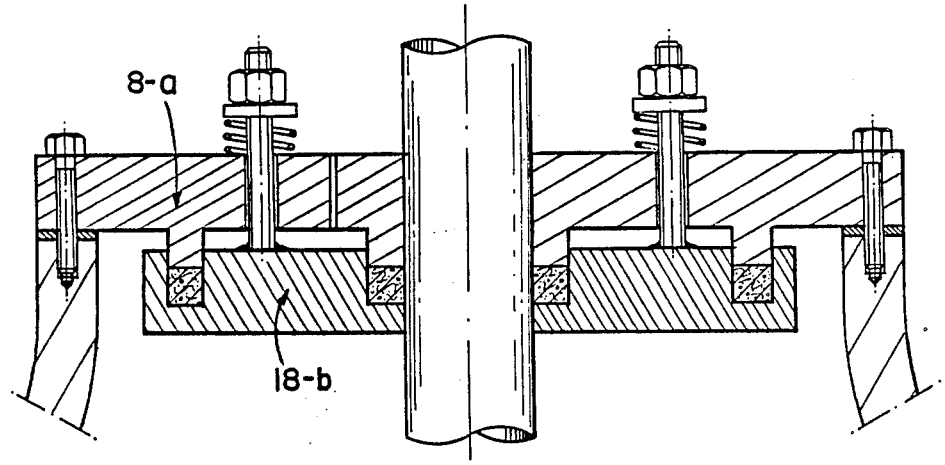
FIG. 11 is a schematic view of one variation of the first embodiment of the invention.

Several embodiments of the invention have been described above, and it should thus be appreciated that the invention can be implemented in a variety of ways. Without intending to limit the extent of such variety, FIG. 11 illustrates one variation which, though not preferred, falls within the scope of the invention. In FIG. 11, the bonnet assembly 8a is shaped somewhat differently from that shown in the other figures. The structure corresponding to the hub 40 and rim 42 of the gland is shown, for example, in FIG. 1, is carried by the bonnet 8a, and the annular, groove-type recesses 72, 74 such as shown in FIGS. 3 and 5 in the bonnet assembly, are instead provided on the gland assembly 18b. Functionally, however, the embodiment in FIG. 11 is similar to the other illustrated embodiments in that the differential between the system pressure acting on the lower surface of the gland assembly relative to the atmospheric or ambient pressure acting on the isolated portion of the upper surface of the gland assembly, produces a strong compressive force against the packing ring adjacent the shaft, whereby leakage through the bonnet along the shaft is prevented. As in the other embodiments, an outer packing is preferably employed to help isolate the system pressure from the annular space to be maintained at ambient pressure.

Figure 12:
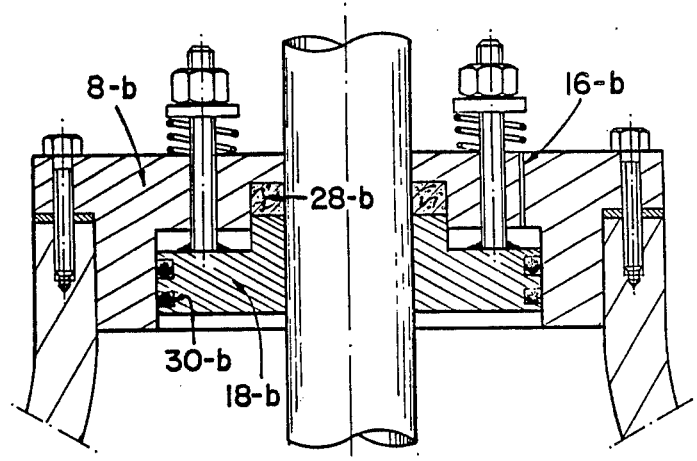
FIG. 12 is an elevation view, in section, of another variation of the first embodiment of the invention.

FIG. 12 illustrates another way to implement the invention. This variation, which can be very useful in some applications, also falls within the scope of the invention.

In FIG. 12 the bonnet assembly 8b is again shaped somewhat differently from that shown in other figures and the portion of the upper surface of the gland 18b in communication with the ambient by the "pin hole" 16b, is isolated at all times from the system pressure by providing a plurality of O-rings 30b located in grooves between the inner cylindrical surface of the bonnet assembly 8b and the outer cylindrical surface of the gland assembly 18b. With this embodiment, all the force applied by the system pressure to the gland assembly 18b is available for the lower shaft packing 28b. With an outer diameter for the gland assembly of only four inches, it is possible to obtain a radial packing stress of 1,200 psi.

Figure 13:
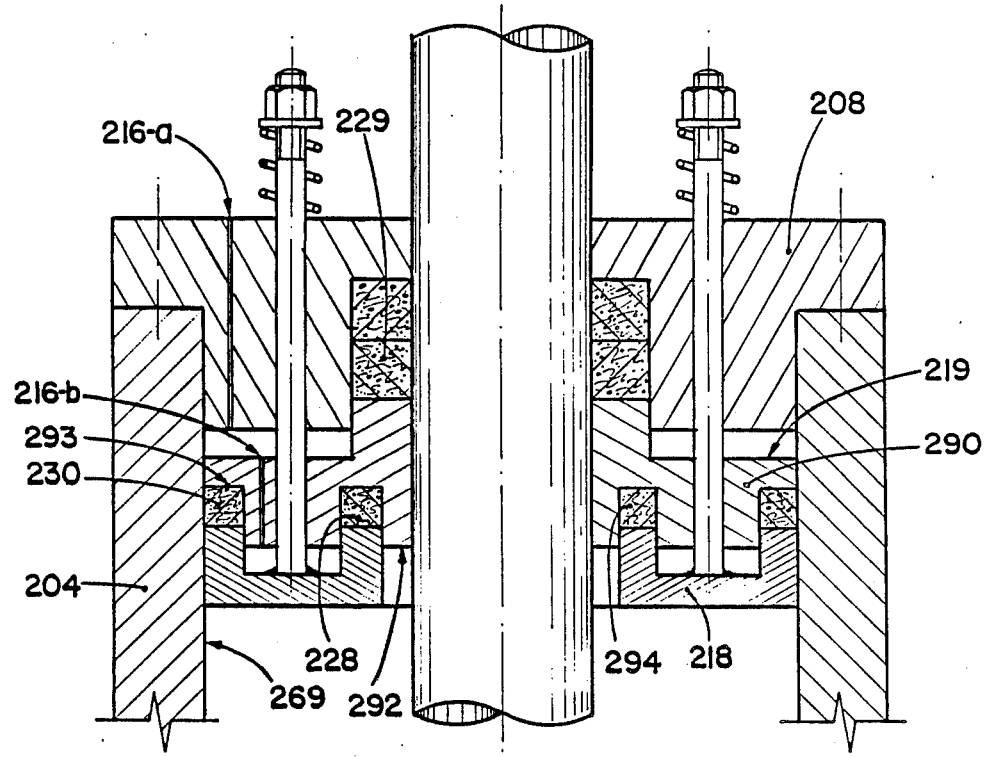
FIG. 13 is a sectional view, in side elevation, illustrating a fourth embodiment of the invention with the novelty that the seal assembly can self compensate potential wear in the shaft packing.

FIG. 13 illustrates a fourth embodiment of the invention which is preferred because not only are all packing rings self pressurized under the principle explained with respect to FIG. 1, but a further novelty is incorporated in the seal in that wear and consolidation on the shaft packing is self compensated by the housing pressure.

In this embodiment the axial compression of the shaft packing is provided by a first internal gland or collet piston 290 bearing against the shaft packing 229. In addition, the portion of the upper surface 291 in communication with the ambient by the "pin hole" 216a, is isolated at all times from the housing pressure by providing a secondary packing ring 230 located between the inner surface of the housing and an outer counterbore 293 in the collet piston.

To perform the self pressurization of the second packing ring 230 a second internal gland assembly component in the form of a pressure plate or gland 218 is located coaxially below the collet piston lower portion 292. The portion of the upper surface of this gland 218, in communication with the ambient by the "pin hole" 216b in the collet piston, is isolated permanently from the housing pressure by providing a third packing ring 228 with less diameter and located in a counterbore 294 in the lower surface of the collet piston and axially compressed by the inner rised hub in the internal gland.

It should be appreciated that to prevent wear from the shaft on the inner packing ring 228, it is not laterally in contact with the shaft.

For biasing the internal gland 218 toward the collet piston 290 and the piston toward the bonnet assembly, a plurality of studs, springs and nuts are provided such as shown in FIG. 1.

FIG. 13 thus shows an improved feature of the invention introduced into the embodiment illustrated in FIGS. 12. The incorporation of the collet piston 290 with an unsupported upper surface 291 improves the performance of the embodiment described in FIG. 1 because the system pressure, moreover, can self compensate shaft packing potential wear and consolidation during service. It will thus be seen that the collet piston is free to axially displace with shaft packing shrinkage. Functionally the embodiment illustrated in FIG. 13 is similar to the embodiment that has been described in FIG. 1 but with the introduction of the shaft packing wear self compensation capability.

Figure 14:
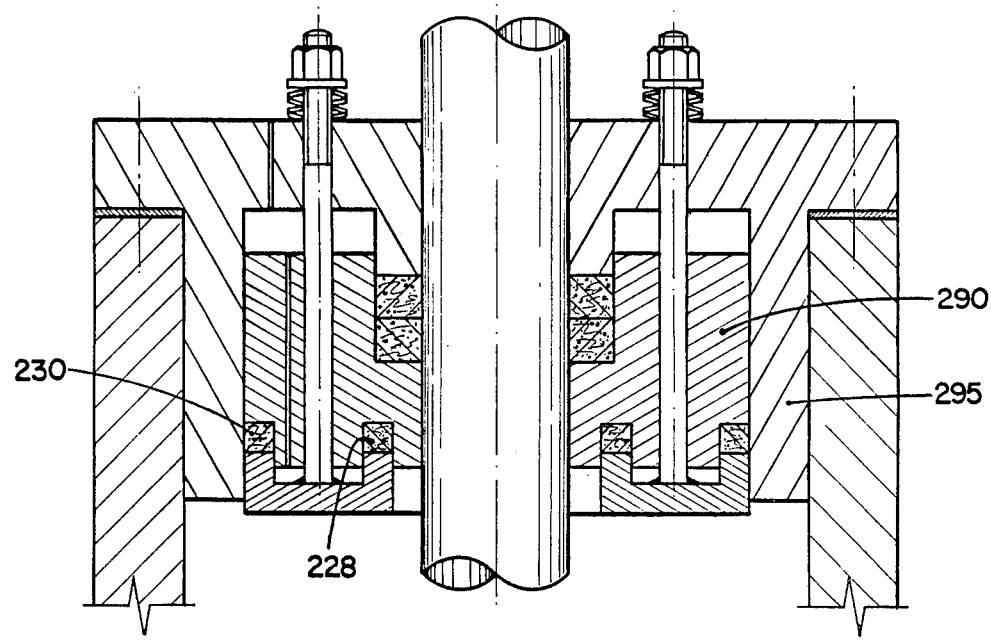
FIG. 14 is an elevation view, in section, of a variation of the embodiment shown in FIG. 13.

FIG. 14 illustrates a variation of the embodiment described in FIG. 13. The bonnet assembly is shaped somewhat differently. The structure corresponding to the upward hub 40 of the internal gland as shown for example in FIG. 1, is inverted and thus carried by the bonnet assembly 208 adjacent the shaft. The annular groove type recess 72 adjacent the shaft in the bonnet assembly of FIG. 1 is instead provided in the collet piston 290. The bonnet assembly further includes a downwardly projecting outer tubular casing 295 concentric with the housing to provide a unitary "packaging" of the sealing arrangement and to facilitate the preassembly of the components as required for particular applications.

Figure 15:
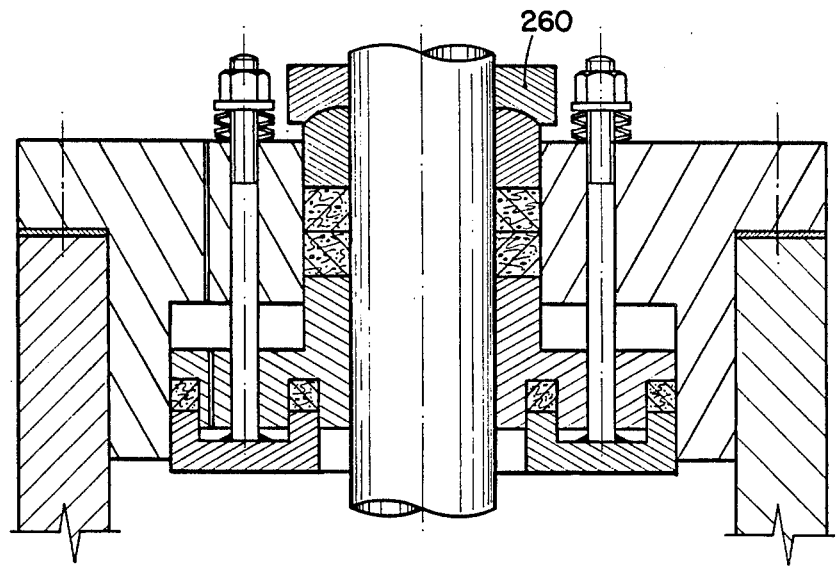
FIG. 15 is an elevation view, in section, of a variation of the embodiment shown in FIG. 14.

FIG. 15 is representative of the features illustrated in FIGS. 13 and 14, with the advantages of the external gland 260 incorporated to facilitate the shaft packing replacement and to provide a flatter distribution of the bulk stress.

Figure 16:
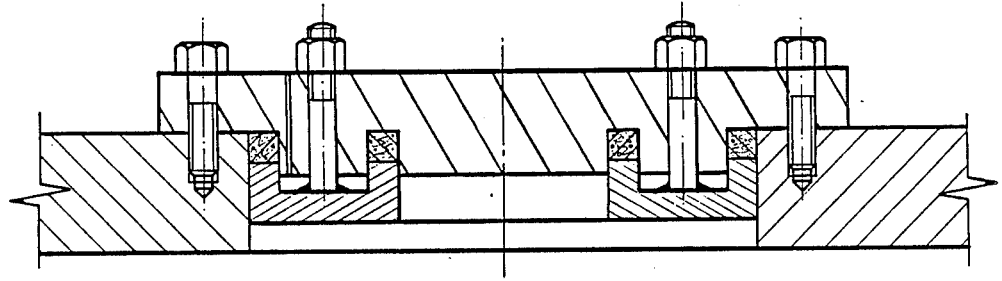
FIGS. 16, 17 and 18 are sectional views depicting three vessel closure applications of the embodiments illustrated in FIGS. 1 and 13.
Figure 17:
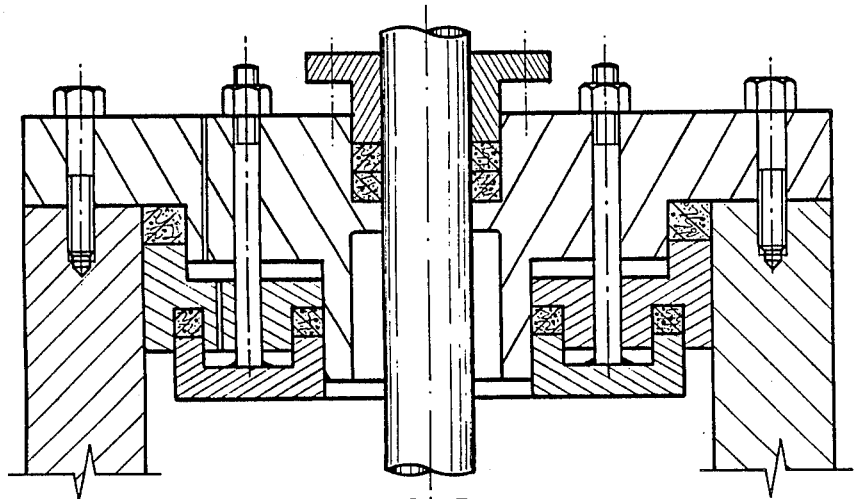
Figure 18:
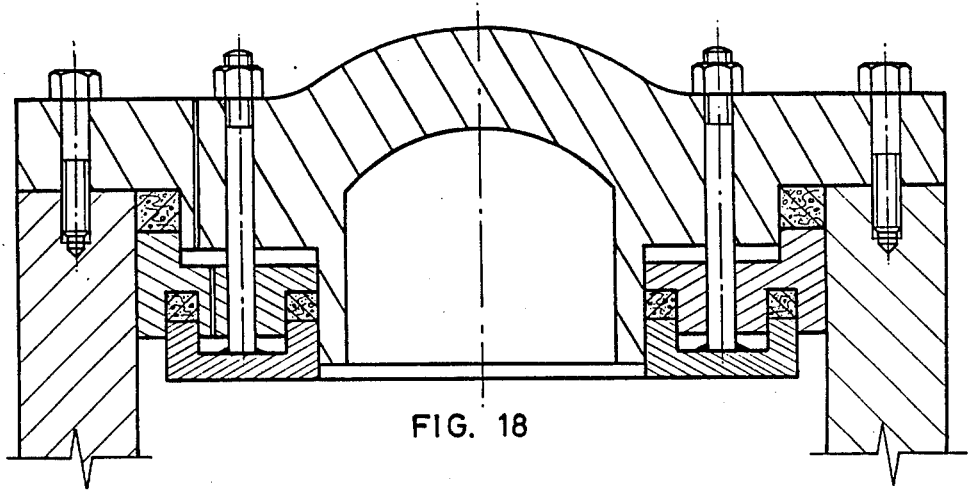

FIGS. 16, 17 and 18 illustrate another aspect of the invention, by which the novel features of the invention as described in the foregoing embodiments ar adapted for the purpose of sealing the closure head of pressure vessels.

For example, it is within the scope of this invention to use the seal described in FIG. 1 to prevent the escape of fluid in all kind of closures as illustrated in FIG. 16, that is, the seal may be reversed and all kind of apertures become the surfaces to be sealed rather than a shaft or stem only. Even the seal described in FIG. 13 may be used in closures of pump-casings, and pressure vessel heads as shown in FIGS. 17 and 18.

Figure 19:
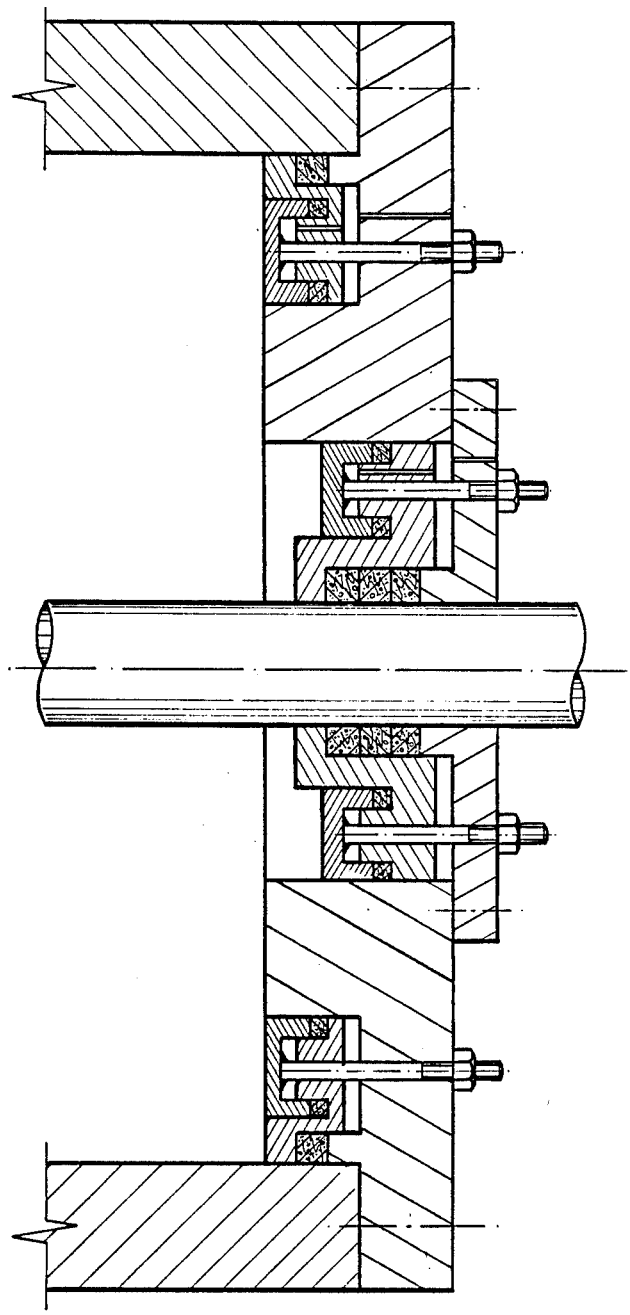
FIG. 19 is a sectional view of a valve or pump depicting the generic application of the embodiment disclosed in FIG. 13.

The arrangement shown in FIG. 19 seals the bore of a housing or pump case and the shaft penetration independently. A pair of the seals described in FIG. 13 can be used as illustrated with the collet piston, shaped somewhat differently from that shown in other figures.

A closure arrangement is presented for a pressure housing, the housing having an opening defined by a wall perimeter comprising a head assembly rigidly supported by the housing and covering the opening. The head assembly has an exterior surface exposed to the atmosphere and a lower surface exposed to the opening. A gland assembly is disposed within the opening below the head assembly exterior surface, said gland assembly having an upper surface facing the head assembly lower surface and a lower surface exposed to the pressure of the housing. A first packing is encapsulated by said wall perimeter, a first portion of said head assembly lower surface, and a first portion of said gland assembly upper surface. A second packing is encapsulated by a second portion of said head assembly lower surface and a second portion of said gland assembly upper surface. The first and second packing are interposed between a third portion of the head assembly and a third portion of the gland assembly so as to establish an enclosed space between the head assembly lower surface and the gland assembly upper surface, radially intermediate the first and second packing This embodiment includes means for communicating ambient pressure from said head assembly exterior surface to said space and means for biasing the gland assembly to preload the first and second packing against the head assembly lower surface, such that upon pressurization of the housing, a pressure difference develops between at least a portion of the lower surface of the gland assembly and the third portion of the gland assembly upper surface defining said space, whereby the gland assembly is urged toward the head assembly and the first and second packing thereby form seals to prevent leakage of fluid from the housing.

Turning again to the stem o shaft sealing aspect of the invention, in some applications the packing ring in contact with the housing can wear because the housing pressure has permanent pulsations or the closure is frequently disassembled. From the construction shown in FIG. 20, the housing bore and shaft penetration are sealed by a unique seal package having the specific objective of self compensating wear and packing consolidation in both closures.

In accordance with this fifth embodiment of the invention, sealing is accomplished by placing a pair of collet pistons in tandem. The first collet piston 290a provided for the shaft packing 229 is similar to that described in FIG. 13 and the second collet piston 290b provided for the housing packing is reversed to accomplish this function. This seal arrangement thus operates under the functional principles explained in the foregoing embodiments.

Figure 20:
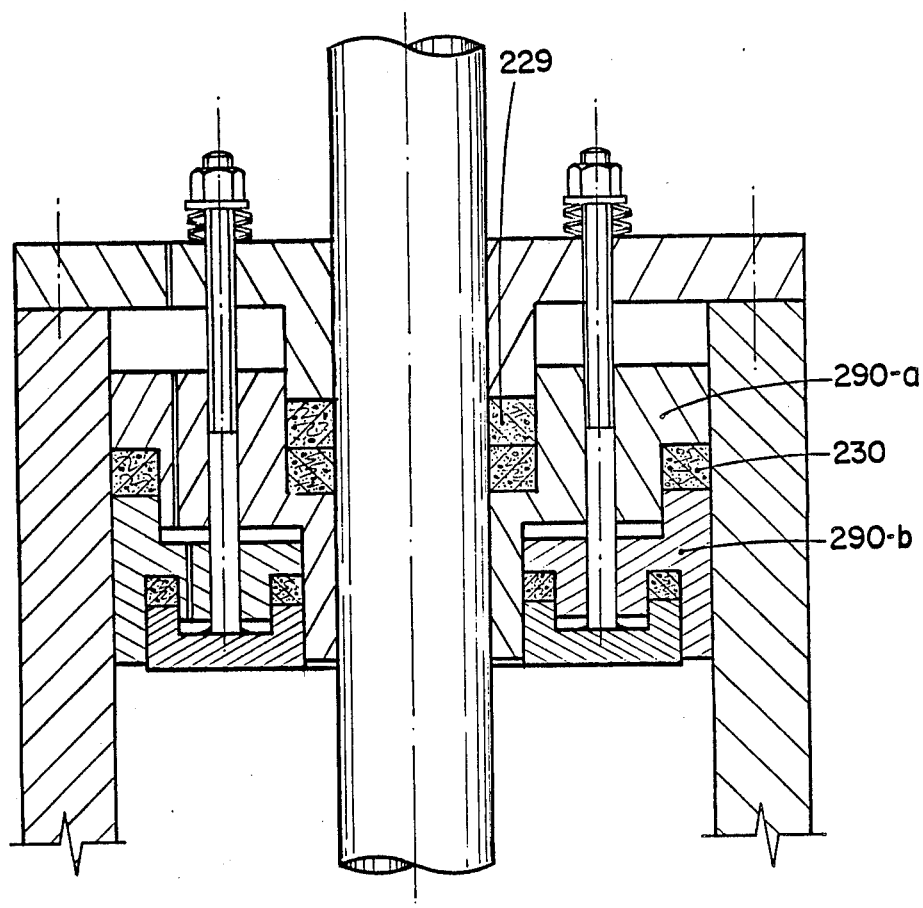
FIG. 20 is a sectional view in side elevation, illustrating a fifth embodiment, having a pair of seals in tandem, based on the embodiment disclosed in FIG. 13
Figure 21:
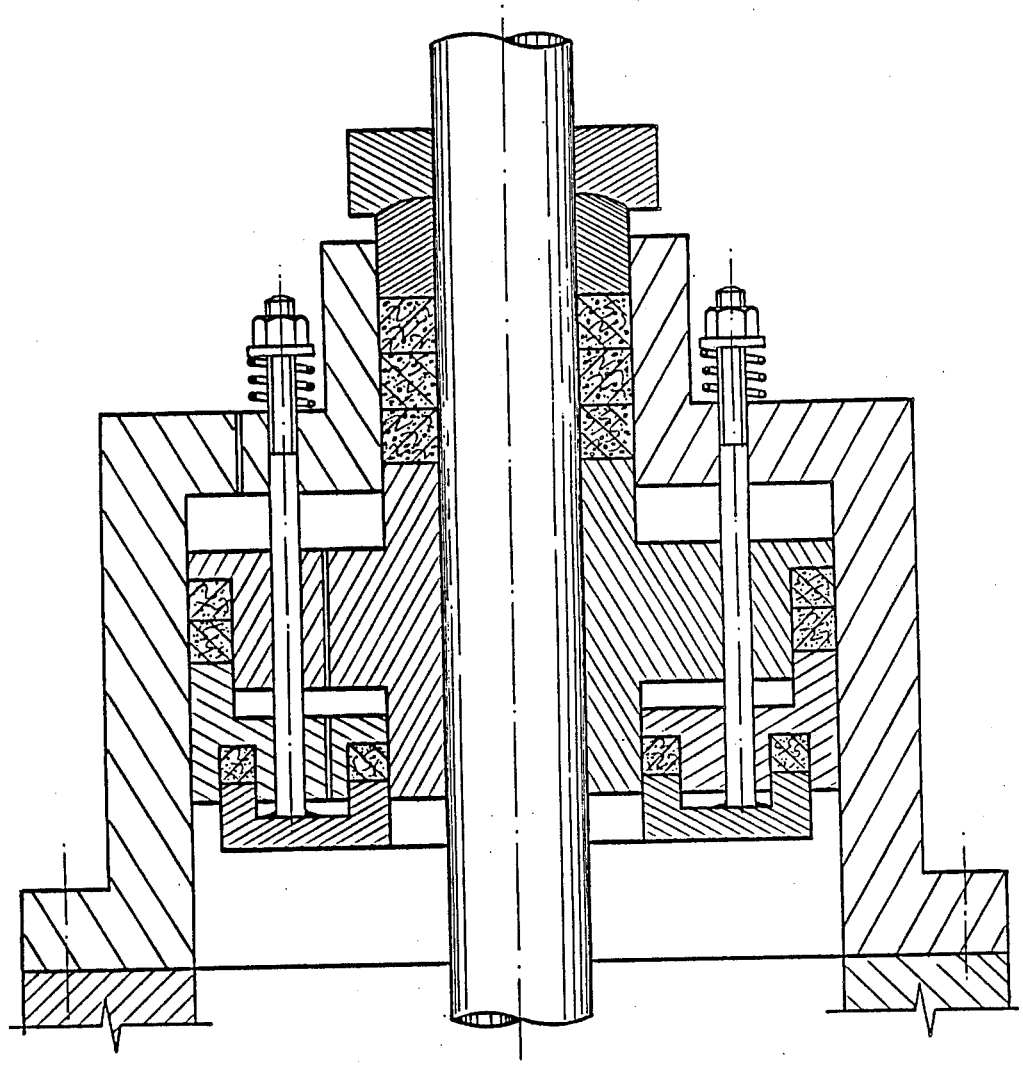
FIG. 21 is a sectional view, in side elevation, of a variation of the embodiment of the invention shown in FIG. 20.

FIG. 21 describes one variation where the bonnet assembly and collet piston are both shaped differently. Functionally the embodiment is similar to that described in FIG. 20, with this arrangement including the capabilities of an adjustable external gland adjacent the shaft.

Figure 22:
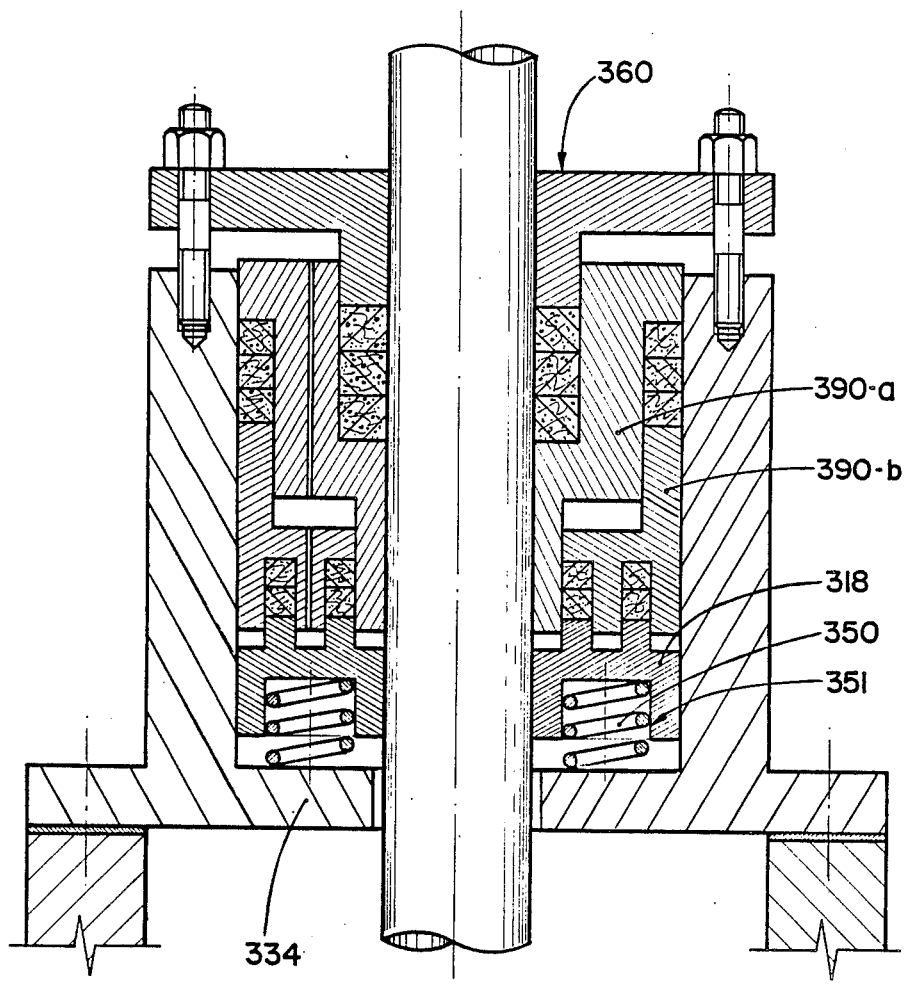
FIG. 22 is a sectional view, in side elevation, illustrating a sixth embodiment of the invention in which the preload stud mechanisms are eliminated.

FIG. 22 illustrates a sixth embodiment, where the studs or posts used in former embodiments to provide the initial squeezing and preload of the seal has been eliminated. To accomplish the stud mechanism functions the bonnet assembly includes rigid annular shoulder 334 facing upward adjacent the shaft and the gland assembly has a plurality of springs 350 located inside cylindrical holes 351 drilled in the circumferential lower side and bearing upon the inner shoulder of the bonnet assembly. The bonnet assembly is provided further with the external conventional gland 360.

From the construction set forth in FIG. 22 it will be seen that upon screwing down the external gland 360, so as to draw the two collet pistons 390a, 390b of the gland assembly together with the internal gland or pressure plate 318, a downward force is exerted to overcome the resistance of the springs 350, and the lower surface of this internal gland can then bear upon the inner shoulder of the bonnet assembly. As the external gland 360 is drawn down, the internal gland is forced against the bonnet shoulder and pressure is applied at the sam time to all packing rings and as a result they are manually squeezed to establish a fluid-tight initial seal.

When the desired flowing of all packing rings has been accomplished the external gland can be unscrewed in its adjusted position to keep up a small preload in the springs set. The spring set prevents either the sticking or jamming of the internal gland in the bonnet cavity. It should be expressly understood, however, that the plurality of springs are not intended for providing any force to the internal gland when the seal is in service because the sealing action of the present embodiment in service is primarily provided by system pressure rather than the springs set.

It should also be understood that in this embodiment the first collet piston 390(a) upper surface is directly in contact with the ambient to accomplish the function of self-pressurization in the shaft packing.

Figure 23:
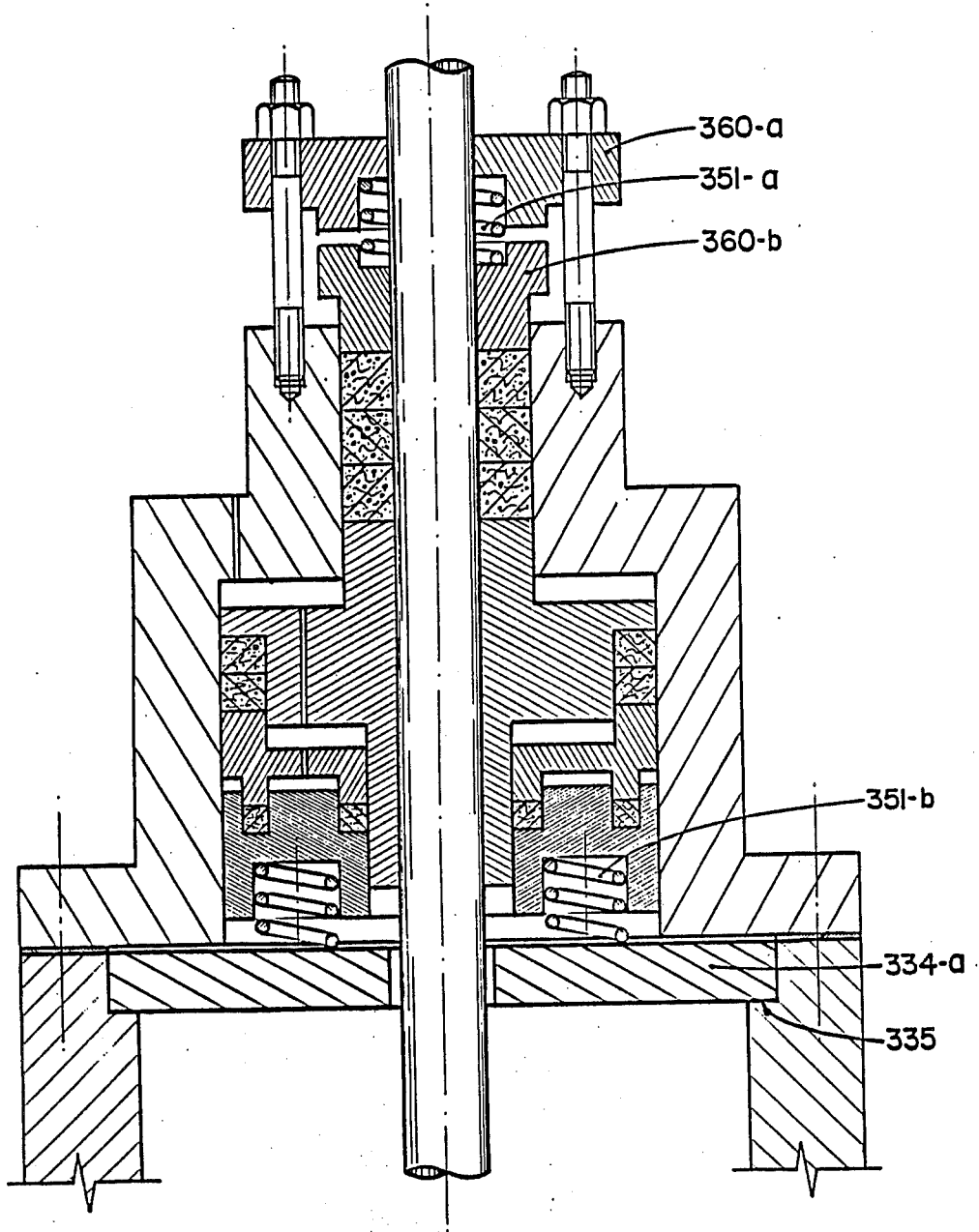
FIG. 23 is an elevation view, in section, of a variation of the embodiment shown in FIG. 22.

FIG. 23 illustrates one variation of FIG. 22 where the bonnet assembly, the two collet pistons and the internal gland are shaped differently but functionally are similar. This construction includes the capability of one external gland but it has been split into two pieces. Follower 360a and the gland 360b are provided each with opposed counterbores for receiving a spring 351a. This spring confined by both counterbores reinforces the action of the lower set of springs 351b to keep a small preload when the seal is not in service.

The assembly of the seal is accomplished by providing a retainer plate 334a as a substitution of the bonnet internal shoulder and bearing against a housing counterbore 335.

Finally, the spring 351a in the arrangement of the upper gland can be used in this embodiment without the lower spring set 531b, i.e., with the internal gland bearing directly upon the retainer plate. The embodiment operates in a way that was explained for FIG. 22.

Figure 24:
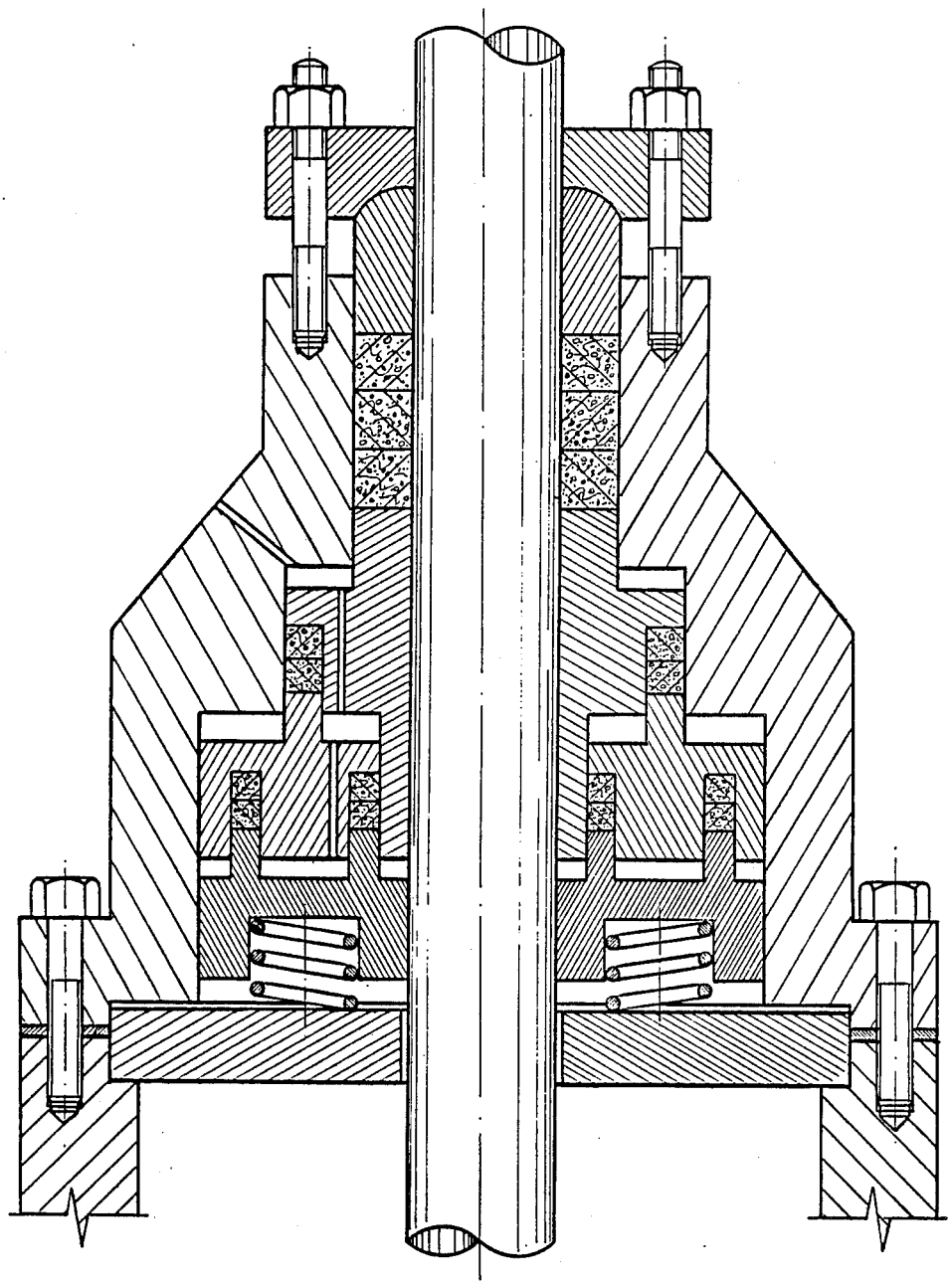
FIG. 24 is a sectional view, in side elevation, illustrating another variation of the embodiment shown in FIG. 22.

FIG. 24 illustrates another variation of FIG. 22 where the second collet piston is shaped differently in order to provide a larger surface for the self-pressurization of the lower packing rings in the collet piston.

Figure 25:
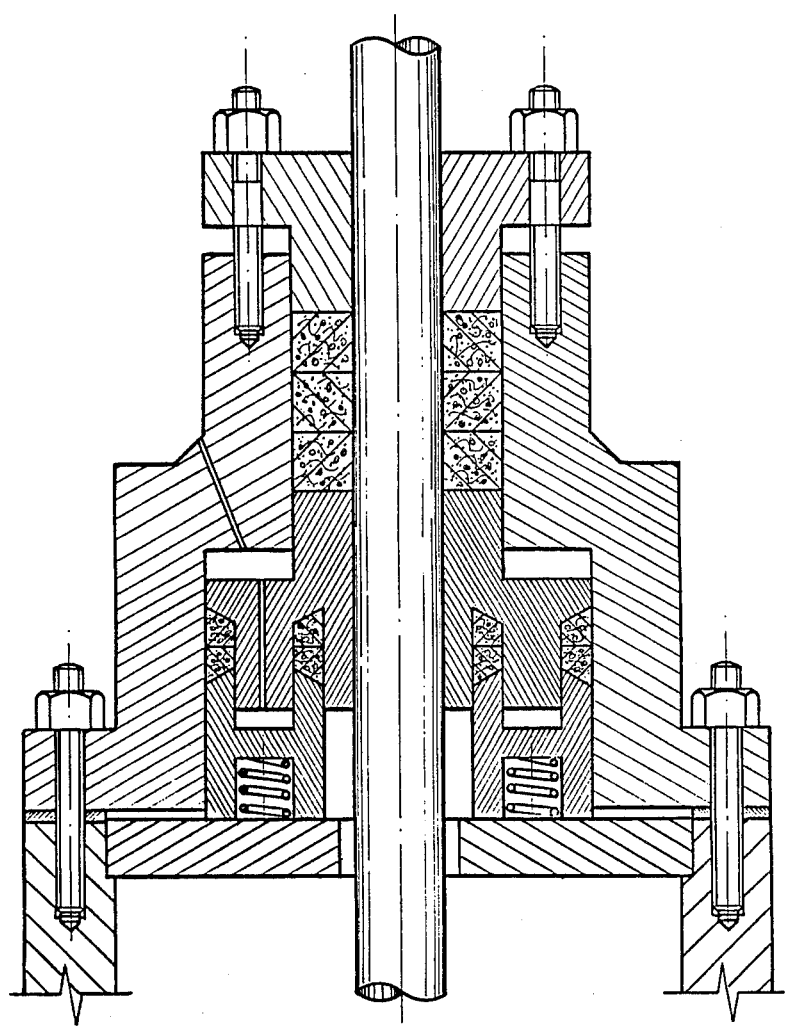
FIG. 25 is an elevation view, in section, illustrating one more variation of the embodiment shown in FIG. 22.

FIG. 25 illustrates one more variation of FIG. 22 where only one collet piston is provided. In order to obtain additional radial compression in the lower packing rings, the counterbore of the collet piston and the raised hubs in the internal gland are provided with sloped faces bearing against these two packing rings.

In a basic design specification of the invention it is impossible to describe the enormous variety of bonnet assemblies and internal configurations that can be used for different applications.

FIGS. 26–32 are representative of this statement and prove that the functional principles of the invention can be implemented in many ways which fall within the scope of the invention.

In FIG. 26 the bonnet assembly 508 as coaxially with the shaft a cylindrical cavity defined by inner and outer walls 510, 512. The gland assembly includes two inner collars disposed within the cylindrical cavity. Section BB (FIG. 26-b) shows the upper collar 501 is provided with two raised hubs 503 that extend outside the bonnet assembly through two holes in it. The lower collar 502 has four similar hubs 504 projecting downwardly and bearing against the internal gland plate 518. The two collars have thereinbetween outer 530 and inner 528 packing rings concentric with the shaft and local packing rings 532b concentric with the posts 534b that pass through hubs 503, 504.

Section AA (FIG. 26-a) shows how the gland plate 518 is joined to the upper side of the bonnet assembly by means of two additional posts 534a and nut/washers 535a. The nut/washers' bearing against the upper surface of the bonnet assembly prevents the axial displacement of the gland plate 518 downwardly when the outer gland 520 is tightened down to preload the shaft packing 522. Between the two collars, local packing rings 532a are concentric with two additional posts 534a. As shown in section BB by means of the two posts 534b and nuts 535b the two collars 501, 502 and packing rings thereinbetween 528, 530, 532 can be preloaded from outside of the bonnet assembly to permanently isolate the annular cavity 550 from the system pressure. This cavity is in communication with the ambient by the "pin hole" 516 (Sec. AA).

When the housing is under pressure the lower collar 502 can slide upwardly relatively to all posts and the upper collar 501 cannot move because the nuts 535b prevent this movement. The upward advance of the lower collar 502 will self pressurized and compensate wear in all packing rings between the two collars and at the same time the force generated in the lower collar by the system pressure will also cause the gland plate 518 to be urged upwardly whereby the shaft packing will be self compressed. The posts operatively couple the collars and the gland plate whereby the upward urging of the lower collar 502 compresses the shaft packing 522 via gland plate, with the upward movement of plate 518 limited by the loaded density of rings 522 The lower collar 502 can rise further, independently of plate 518, relative to a stationary upper collar 501, due to the ambient pressure in cavity 550, therby compressing and compensating for consolidation in packing rings 528, 530, 532. Thus, in accordance with the preferred embodiment of the invention it can be seen in FIG. 26 that the system pressure can self compensate for wear and consolidation of the shaft packing because the existence of an unsupported area 575 in the upper collar enables the upward urging of the gland plate relative to the shaft. The four springs 536 located in the lower collar have similar function that was explained in FIG. 22.

FIG. 27 illustrates a variation of the embodiment shown in FIG. 26, with the bonnet assembly somewhat different. It has two cylindrical holes 660 symmetrically spaced from the centerline of the shaft. The internal gland 618 has only two posts 634 provided with two collars 601, 602 fitted as pistons, having packing rings thereinbetween, inside the holes of the bonnet assembly. These packing rings can be axially squeezed by tightening the nuts 635.

In this embodiment the free downward displacement of the gland plate is prevented by the outer annular shoulder portion 615 of the upper collar 601, bearing upon the upper surface of the bonnet assembly. Thus, the shaft packing can be axially squeezed by means of the outer gland assembly prior to placing the device in service. The two springs 636 located in the lower collar have a function similar to that explained in the foregoing embodiments. The ratio of compressive force in all packing rings can be varied by changing the diameter of the two piston collars.

It should be appreciated that the posts in the collars are self sealed in the embodiments shown in FIGS. 26 and 27 by using the functioning principle explained in FIG. 1 and for that reason this type of seal falls within the scope of the present invention.

Figure 28:
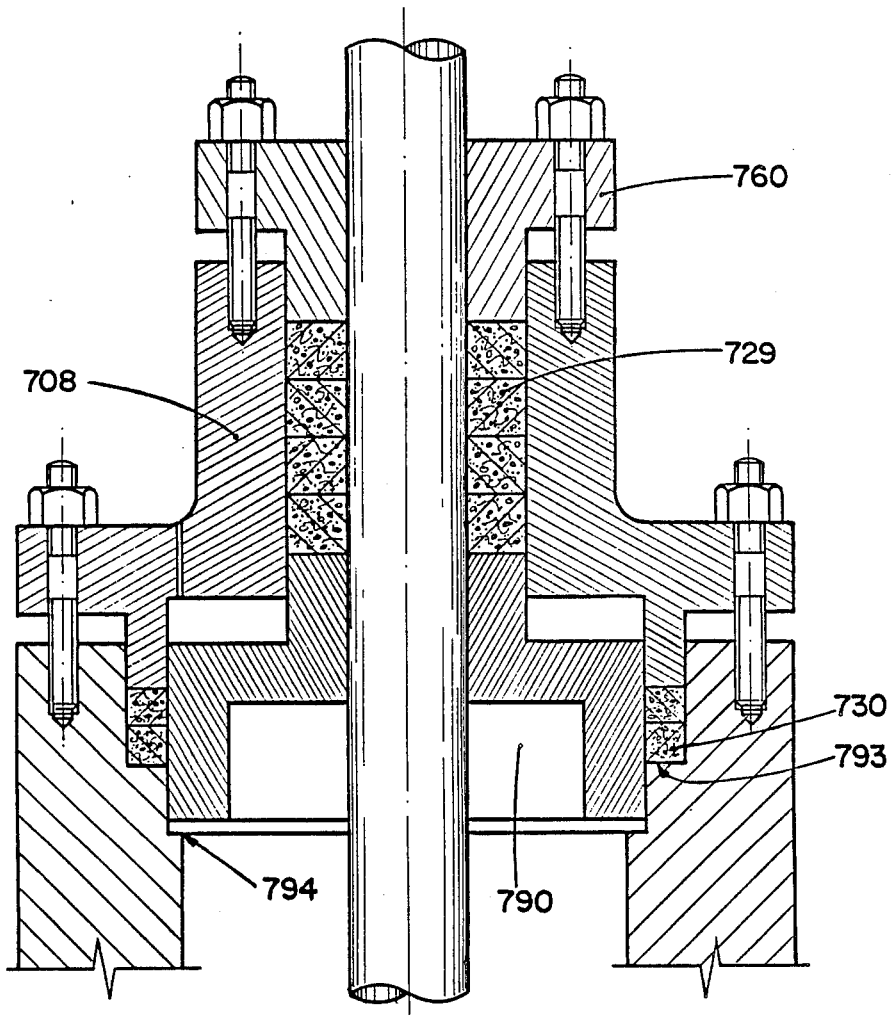
FIG. 28 is a sectional view, in side elevation, illustrating an eighth embodiment of the invention where the axial compression of the secondary packing rings is performed in the conventional way.

FIG. 28 illustrates another important embodiment of the invention because it is very simple and practical. The self-pressurization of the shaft packing 729 is provided as in other embodiments, by an inner collet piston 790. The portion of the upper surface in communication with the ambient is isolated permanently from the housing pressure by providing a secondary packing ring 730 located between the outer cylindrical surface of the collet piston and an inner counterbore 793 in the housing.

It should be appreciated that the axial compression of the secondary packing ring 730 is performed externally by the bonnet assembly shaped like an outer gland follower 708 and for this reason this is not a self-pressurized packing ring. The advantage in the performance of this secondary seal against the conventional one is that in this embodiment, it does not suffer wear because the collet piston is practically a stationary piece. Furthermore, friction between this secondary seal and the outer cylindrical surface of the collet piston will keep this collet piston in place when the housing is in the shutdown condition.

The housing assembly includes an inner annular shoulder 794 and upon screwing down the shaft external gland 760, the lower surface of the collet piston can then bear upon this shoulder and the shaft packing rings can be manually squeezed to establish a fluid-tight initial seal.

Figure 29:
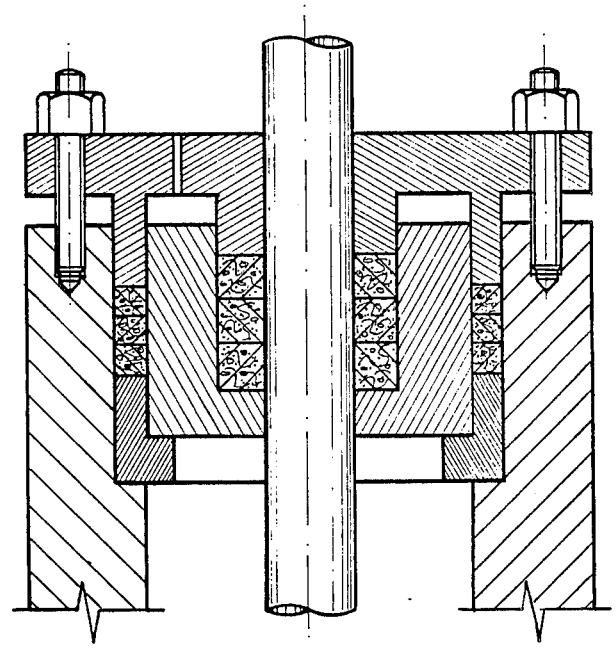
FIGS. 29, 30 and 31 are elevation views, in section, of variations of the embodiment shown in FIG. 28.

FIG. 29 illustrates one variation of the embodiment described in FIG. 28 where the bonnet assembly is shaped like an outer gland follower of double action to perform the axial compression of the secondary packing ring in the housing and at the same time, the fluid-tight initial seal in the shaft packing. Furthermore, the collet piston is shaped somewhat differently to accomplish his function. The housing assembly further includes a removable inner tubular casing for particular applications. Functionally, this embodiment is similar to that described in FIG. 28.

Figure 30:
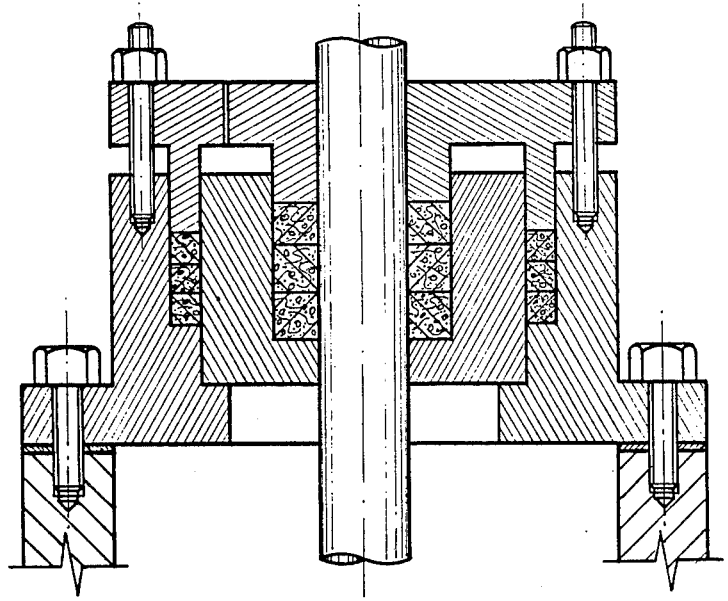

FIG. 30 illustrates one variation of FIG. 29 where the outer double action gland follower is independent of the bonnet assembly for particular applications.

Figure 31:
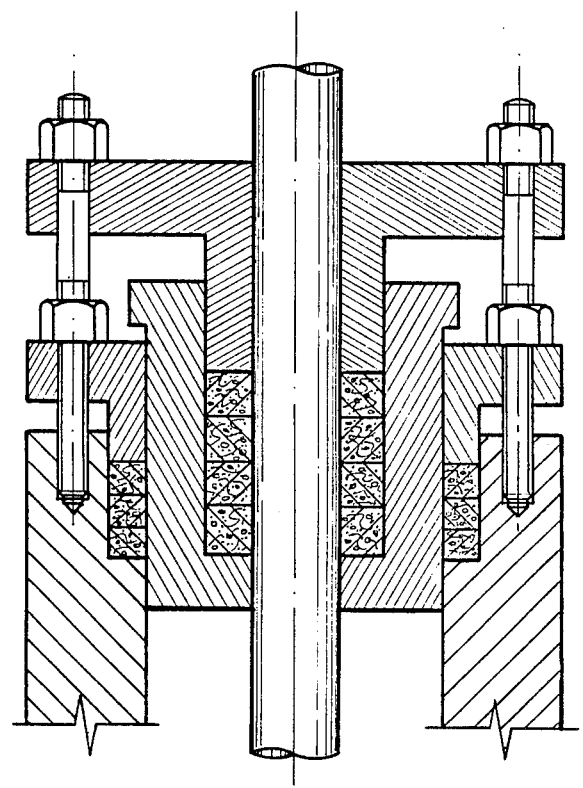

FIG. 31 illustrates another variation of the embodiment described in FIG. 28 where the axial compression of the secondary packing in the housing is performed by an outer gland follower coaxially disposed with the collet piston and an inner shaft packing gland which provides the initial preload of the shaft packing.

These two concentric gland followers are directly coupled by common studs and can be tightened independently by means of two different pairs of nuts provided in the studs.

The collet piston is provided with an outer shoulder bearing upon the upper surface of the housing gland follower to establish a fluid-tight initial seal in the shaft packing by means of the shaft packing gland. Furthermore, the collet piston upper surface is directly in contact with the ambient to accomplish the shaft packing self-pressurization.

Figure 32:
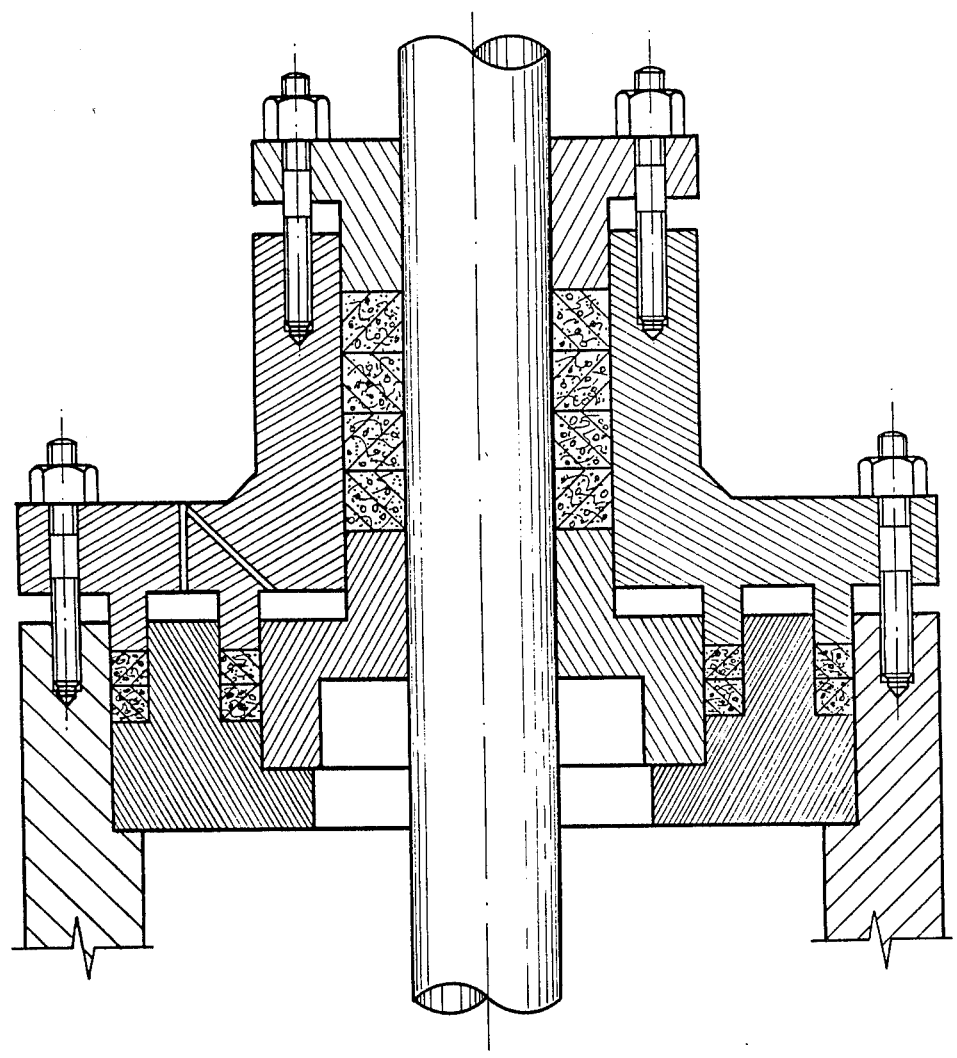
FIG. 32 is a sectional view, in side elevation, illustrating another variation of the embodiment shown in FIG. 28 where the secondary packing rings are self-pressurized.

With the arrangement shown in FIG. 32, the shaft penetration and housing bore are sealed by means of the collet piston in contact with an inner pressure plate of double action to self-pressurize the two outer secondary packing rings. In this embodiment, the portion of the upper surface of the collet piston and the portion of the upper surface of the inner pressure plate in communication with the ambient by two different "pin holes" are isolated permanently from the housing pressure by a common intermediate packing ring.

Functionally, the embodiment illustrated in FIG. 32 is similar to the embodiment that has been described previously in FIG. 28 but with the introduction of the self-pressurization in the two secondary packing rings.

It should be appreciated that the shaft or stem sealing embodiments described herein with respect to FIGS. 1, 4–15, and 19–32, although differing i appearance, share several fundamental elements. Such arrangement for sealing the penetration of a shaft into a housing includes a bonnet assembly covering the opening and having an aperture through which the shaft enters the housing, an annular shoulder adjacent the shaft, and the bonnet assembly being securable to the housing. A gland assembly is provided coaxial with the bonnet assembly and having an aperture below the bonnet assembly through which the shaft passes. The gland assembly has an upper surface with an effective area perpendicular to the shaft axis that is maintained at ambient pressure and a lower surface having effective area perpendicular to the shaft axis exposed to the housing internal pressure. A first annular packing is positioned adjacent the shaft intermediate the bonnet assembly and the gland assembly apertures, for preventing leakage along the shaft. A second annular packing, having a larger diameter than the first packing, is positioned between the housing and at least one of the gland assemblies or the bonnet assemblies for preventing leakage along the housing. Means are provided for compressing the first packing between the bonnet assembly and the gland assembly, and means are provided for compressing the second packing between the housing and said one of the gland assemblies or the bonnet assemblies. With this arrangement, upon system pressurization, the gland assembly is slideable longitudinally relative to the shaft, thereby further compressing at least the first packing against the shoulder commensurate with the housing pressure.

In several of the embodiments described above, the second packing is in the form of a conventional gasket such as shown at 58 in FIG. 1. In other embodiments such as shown in FIG. 7, the second packing is supported by the gland assembly against the housing in a manner similar to the relationship between the gland assembly and the portion of the bonnet assembly 60 adjacent the shaft.

The means for compressing the second packing could be a bolt such as 56 as shown in FIG. 1 or the post 26 is shown in FIG. 9, for example.

In the embodiments shown in FIGS. 5, 8, and 14, for example, a third annular packing 74, 30, 230 is provided between the gland assembly and at least one of the housing and the bonnet assembly, radially intermediate the first and second packings. The term "radially intermediate" is intended to include the arrangement such as shown in FIG. 5, where the first, second and third packings include at least portions lying on the same horizontal plane, and also arrangements such as shown in FIG. 14, where the third annular packing 230 is radially intermediate but not at the same elevations as the first packing around the shaft and the second packing such as the housing gasket. Similarly, in embodiments similar to those shown in FIG. 13, the gland assembly upper surface 291 which is maintained at ambient pressure, is considered to be intermediate the first and second packing, in that the radially outer boundaries of the packings are substantially aligned with the radially inner and outer boundaries of the upper surface 291 and space defined thereby.

It should also be appreciated that in many instances whether a particular structure is deemed a part of the bonnet assembly or the housing, is a matter of convenience rather than significance with respect to the present invention. For example, in FIG. 22 shoulder 334 is part of the bonnet assembly in that the structure is bolted to the housing. Similarly, in FIG. 23, the annular shoulder 334(a) is not attached to the bonnet assembly in the housing, but is, like the bonnet assembly, supported by the housing and could be deemed part of the bonnet assembly or part of the housing, insofar as equivalent structure to that recited in the claims is concerned.

With respect to the embodiment of the invention shown in, for example, FIGS. 26 and 27, it should be appreciated that the gland plate 518 or 618 which defines the gland assembly aperture and which compresses the first packing, can be a unitary piece or, as shown, include a ferrule or the like around the shaft in contact with the first packing, and supported by the gland plate.

With the embodiments illustrated in FIGS. 13-15, 17-27, and 32, it should be appreciated that the provision of one gland assembly upper surface 291, associated with the upper side of the annular collet piston 292, for example, does not preclude the provision of a second space at ambient pressure between the collet piston lower surface and the upper side of the pressure plate 218, (see FIG. 13). In FIG. 20 for example, three such annular spaces maintained at ambient pressure are associated with the gland assembly.

With the present invention, it is also possible that, as in the embodiment shown in FIG. 31, the upper surface of the gland assembly maintained at ambient pressure, is directly exposed to the atmosphere without the need for pin holes or other conduits or the like. Such embodiments are, however, typically associated with the system pressure being utilized to further compress one or the other of the first and second packing. For example, in FIG. 31 the second packing is mechanically compressed using the bolts to the full extent required to provide a seal against system pressure, whereas the first packing is initially mechanically preloaded and is further compressed by the system pressure acting on the lower surface of the gland assembly.

It should be appreciated that various embodiments of the present invention can be used in combination, such as shown in FIG. 19, wherein the outer, annular structure is connected to the housing and includes closure seal means in accordance with one aspect of the present invention, yet a large enough opening is provided around the shaft such that the bonnet assembly and gland assembly structure associated with the other aspect of the invention can be utilized to seal the shaft. In this type of arrangement, the annular outer structure is in effect a closure member relative to the housing, and it is equivalent to a housing structure with respect to the stem sealing arrangement.

I claim:

1. An arrangement for sealing the penetration of a shaft into a pressure housing comprising:
   a pressure housing having an opening;
   a shaft passing through the opening into the housing;
   a bonnet assembly rigidly supported by the housing and covering the opening, the bonnet assembly having upper and lower surfaces and further including,
      means defining a first aperture through which the shaft enters the housing, and
      means for communicating ambient pressure from the upper to the lower surface of the bonnet assembly;
   a gland assembly within the housing coaxially disposed below the bonnet assembly and further including,
      an upper surface having a portion thereof spaced from the bonnet lower surface and in pressure communication with said means for communicating ambient pressure, and a lower surface exposed to the interior of the housing,
      means defining a second aperture penetrated by the shaft, and
      means for preloading the gland assembly toward the bonnet assembly;
   packing means between the bonnet assembly and the gland assembly for axial compression therebetween, including
      a first packing ring encapsulated by said shaft and portions of said bonnet assembly and said gland assembly, and
      a second packing ring encapsulated at least in part by portions of at least said bonnet assembly and said gland assembly,
      said first and second packing rings providing a seal against intrusion of system pressure onto said upper surface portion of the gland;
   such that upon pressurization of the housing, a pressure difference develops between the lower surface of the gland exposed to the housing pressure and the upper portion of the gland in communication with said means for communicating ambient pressure, whereby the gland assembly is urged toward the bonnet assembly and the packing rings are thereby deformed to prevent leakage of fluid from said bonnet assembly along said shaft.

2. The arrangement of claim 1 wherein the bonnet assembly includes an outer portion supported by the housing, an inner portion including said means defining a first aperture, and an intermediate body portion extending coaxially with said shaft and defining cylindrical wall means in lateral contact with the first packing ring.

3. The arrangement of claim 2 wherein the outer portion of the bonnet assembly is detachably rigidly connected to the housing.

4. The arrangement of claim 2 wherein the inner portion of the bonnet assembly is rigidly detachably mounted on said body portion of the bonnet.

5. The arrangement of claim 4 wherein s id inner portion of the bonnet assembly includes means for axially adjusting the position of said inner portion relative to the shaft, to selectively axially preload said first packing ring.

6. The arrangement of claim 5 wherein said inner portion of the bonnet comprises a generally cup-shaped collet member rigidly and detachably mounted thereon and including a shoulder portion in contact with the upper end of said first packing ring, said inner portion further including a third packing ring annularly disposed around the shaft and resting on said shoulder, and a collar member around the shaft and rigidly and detachably mounted on the body portion of the bonnet, for compressing said third packing ring against said shoulder.

7. The arrangement of claim 2 wherein said means for communicating ambient pressure include vertical channels extending between the upper and lower surfaces of said body portion of the bonnet assembly.

8. The arrangement of claim 2 wherein said means for preloading the gland assembly includes post members rigidly connected to the gland assembly and extending through the body portion of the bonnet assembly, and means operatively engaging the post members and the bonnet assembly for drawing the gland upwardly relative to the bonnet assembly, whereby the packing means are preloaded while maintaining the spaced relationship between said gland assembly and said bonnet assembly.

9. The arrangement of claim 2 wherein said outer bonnet portion further includes means operable from above the bonnet, for adjustably preloading said second packing ring.

10. The arrangement of claim 2 wherein
said gland assembly has (a) a substantially flat lower surface, (b) an upper surface having an inner, raised hub defining said second aperture and a substantially flat portion defining the portion of said upper surface in communication with said means for communicating ambient pressure, and (c) a substantially cylindrical outer surface
said bonnet assembly outer portion includes a substantially cylindrical surface opposed to said cylindrical outer surface on said gland assembly, and
said second packing ring is in the form of an O-ring located between said cylindrical surfaces.

11. The arrangement of claim 1 wherein said means for communicating ambient pressure includes at least one vertical channel between the upper and lowermost surfaces of the bonnet assembly.

12. The arrangement of claim 1 wherein said gland assembly has a substantially flat lower surface and an upper surface having an inner, raised hub defining said second aperture, an outer raised rim, and a substantially flat intermediate portion defining said upper surface in pressure communication with said means for communicating ambient pressure.

13. The arrangement of claim 12 wherein said hub is in contact with said first packing ring, and said rim is in contact with said second packing ring.

14. The arrangement or claim 12 wherein the bonnet assembly includes an outer portion supported by the housing, an inner portion including said means defining a first aperture and an intermediate body portion between the inner and outer bonnet portions, and wherein said intermediate portion of the gland assembly is below said body portion of said bonnet assembly.

15. The arrangement of claim 14 wherein the hub, rim, the intermediate portion of the gland assembly, and the body portion of the bonnet assembly, define an annular space connected to said means for communicating ambient pressure.

16. The arrangement of claim 1 wherein the lower surface of said bonnet assembly includes downwardly projecting hub adjacent the shaft and a downwardly projecting rim between the hub and the housing and wherein the upper surface of the gland assembly includes inner and outer recessed portions opposite the hub and rim, for encapsulating the first and second packing rings therebetween, respectively.

17. An arrangement for sealing the penetration of a shaft into a housing comprising in combination:
a housing having an opening for receiving the shaft;
a shaft centered within the opening;
a hold-down plate covering the opening and having an aperture through which the shaft enters the housing, said hold-down plate further including means defining a rigid, annular shoulder adjacent the shaft;
a pressure plate within the opening and below the hold-down plate, having an aperture through which the shaft passes and an annular shoulder portion adjacent the shaft and below the shoulder on the hold-down plate, thereby defining an annular packing region therebetween;
first packing means located within the packing region, for providing a fluid seal around the shaft;
means for maintaining the hold-down plate in tight, rigid engagement with the housing;
means for maintaining an annular portion of the upper surface of the pressure plate at ambient pressure; and
means for preloading the pressure plate towards the hold-down plate;
whereby upon pressurization of the housing interior, the pressure plate is urged toward the hold-down plate and the packing means is axially compressed between said shoulders to radially deform into sealing engagement with the shaft.

18. The arrangement of claim 17 wherein said means for maintaining an annular portion of the upper surface of the pressure plate at ambient pressure includes said first packing means and a second annular packing means, said first and second packing means disposed at the radially inner and outer extent of said upper surface, respectively, for being compressed between said hold-down plate and said pressure plate, and conduit means communicating between the exterior of the holddown plate and said upper surface.

19. The arrangement of claim 18 wherein the pressure plate has a radially outer cylindrical surface and the hold-down plate has a radially inner cylindrical surface, and wherein said second annular packing means are disposed between said outer and inner cylindrical surfaces.

20. The arrangement of claim 19 wherein said packing means are in the form of at least one O-ring carried in an annular groove in one said cylindrical surfaces.

21. The arrangement of claim 20, wherein the upper surface is radially intermediate the first and second packing and the first and second packing when compressed by system pressure provide seals that at least assist in the maintenance of the ambient pressure on the upper surface.

22. The arrangement of claim 21, wherein said gland assembly includes
an annular collet piston slidable along the shaft and defining said gland assembly aperture and upper surface,
an annular pressure plate situated generally below the collet piston and defining at least some of the gland assembly lower surface, for urging the collet piston along the shaft upon system pressurization.

23. The arrangement of claim 22, wherein the pressure plate includes inner and outer annular rims slidingly engaged with complementary grooves in the collet piston, a pair of concentric annular packings are located between respective rims and grooves, for maintaining a portion of the upper surface of the pressure plate at ambient pressure, the outer of said concentric packings consisting of said third packing.

24. The arrangement of claim 22, wherein the collet piston includes nested relatively slidable upper and lower segments, the upper segment defining the upper surface and the aperture of the gland assembly, the lower segment interposed between the pressure plate and the upper segment, and the second packing being interposed between the upper and lower segments.

25. The arrangement of claim 24, wherein the pressure plate includes inner and outer annular rims slidingly engaged with complementary grooves in the collet piston lower segment, a pair of concentric annular third and fourth packings are located between respective rims and grooves, for maintaining a portion of the upper surface of the pressure plate at ambient pressure.

26. The arrangement of claim 17 further including wall means spaced from and substantially concentric to the shaft, extending between said shoulders, said wall means being rigidly supported by the housing to resist movement radially outward from the shaft, whereby the shoulders, shaft and wall means define an annular packing region.

27. A closure arrangement for a pressure housing, the housing having an opening defined by a wall perimeter comprising:
   a head assembly rigidly supported by the housing and covering the opening, the head assembly having an exterior surface exposed to the atmosphere and a lower surface exposed to the opening;
   a gland assembly disposed within the opening below the head assembly exterior surface, said gland assembly having an upper surface facing the head assembly lower surface and a lower surface exposed to the pressure of the housing;
   a first packing encapsulated by said wall perimeter, a first portion of said head assembly lower surface, and a first portion of said gland assembly upper surface;
   a second packing encapsulated by a second portion of said head assembly lower surface and a second portion of said gland assembly upper surface;
   said first and second packing being interposed between the head assembly and the gland assembly so as to establish an enclosed space between a third portion of the head assembly lower surface and a third portion of the gland assembly upper surface, radially intermediate the first and second packing;
   means for communicating ambient pressure from said head assembly exterior surface to said space;
   means for biasing the gland assembly to preload the first and second packing against the head assembly lower surface;
   such that upon pressurization of the housing, a pressure difference develops between at least a portion of the lower surface of the gland assembly and said third portion of the gland assembly upper surface defining said space, whereby the gland assembly is urged toward the head assembly and the first and second packing thereby form seals to prevent leakage of fluid from the housing.

28. The closure arrangement of claim 27 wherein the wall perimeter defining the opening is cylindrical and is centered on an axis wherein the gland assembly has a substantially cylindrical perimeter having an outer diameter substantially equal to the diameter of the opening.

29. The closure arrangement of claim 28 wherein the first and second packing are annular and have different inner and outer diameters.

30. The closure arrangement of claim 29, wherein the outer diameter of the first packing is substantially equal to the inner diameter of the opening.

31. The closure arrangement of claim 28 wherein the gland assembly is annular and has a substantially U-shaped cross section, forming coaxial outer and inner rims and a flat intermediate surface, the outer rim defining said gland assembly first upper surface portion, said inner rim defining said gland assembly second upper surface portion, and said intermediate surface forming said gland assembly third upper surface.

32. The closure arrangement of 31 wherein the head assembly includes an annular groove on the lower surface thereof, said groove having the same inner and outer diameters as said inner rim and defining the head assembly lower surface second portion.

33. The closure assembly of claim 31 wherein the means for biasing the gland assembly include a post rigidly connected to said third upper surface portion and passing in sliding engagement through the head assembly to the exterior surface thereof.

34. The closure arrangement of claim 28 wherein the head assembly lower surface includes a substantially cylindrical neck centered about said axis and extending toward the interior of the housing, said gland assembly includes an annular collet member coupled to an annular lower segment, the inner diameters of the outer and inner members being substantially equal to the outer diameter of the neck.

35. The closure assembly of claim 28 wherein the outer member includes an outer rim defining the gland assembly upper surface first portion, the gland assembly upper surface second portion i formed by the outer and inner members adjacent said neck, and wherein said neck forms the head assembly lower surface second portion.

36. The closure arrangement of claim 35 wherein said space is formed between said outer rim and said neck.

37. The closure arrangement of claim 36 wherein the inner member has a substantially U-shaped cross section, forming coaxial outer and inner rims and a flat intermediate surface, the outer rim defining said gland assembly first upper surface portion, said inner rim defining said gland assembly second upper portion surface, and said intermediate surface forming a gland assembly third upper surface that in part encloses said space.

38. The closure arrangement of claim 37 wherein said head assembly includes a central aperture coaxial with the neck, and penetrating the exterior surface, a shaft coaxially passing through said aperture, and means in the aperture for sealing the shaft against the leakage of fluid from the housing interior.

39. An arrangement for sealing the penetration of a shaft into a housing comprising in combination:
   a housing having an opening for receiving a shaft;
   a shaft centered within the opening;
   a bonnet assembly covering the opening and securable to the housing and having an aperture through which the shaft enters the housing and an annular shoulder adjacent the shaft;

a gland assembly coaxial with the bonnet assembly having an aperture below the bonnet assembly aperture, through which the shaft passes, an upper surface having an effective area perpendicular to the shaft axis that is maintained at ambient pressure, and a lower surface having an effective area perpendicular to the shaft axis, exposed to the housing internal pressure;

a first annular packing positioned adjacent the shaft intermediate the bonnet assembly and the gland assembly apertures, for preventing leakage along the shaft;

a second annular packing having a larger diameter than the first packing, positioned between the housing and at least one of the gland assembly or the bonnet assembly for preventing leakage along the housing;

means for compressing the first packing between the bonnet assembly and the gland assembly;

means for compressing the second packing between the housing and said one of the gland assembly or the bonnet assembly;

means for supporting the gland assembly for upward displacement relative to the bonnet assembly;

whereby upon system pressurization, the gland assembly is slidable longitudinally relative to the shaft, thereby further compressing at least the first packing against said shoulder commensurate with the housing pressure.

40. The arrangement of claim 39, wherein the second packing is positioned between the housing and the bonnet assembly, and said arrangement further includes, a third annular packing between the gland assembly and at least one of the housing and the bonnet assembly, radially intermediate the first and second packings, compressible by the sliding gland assembly upon system pressurization.

41. The arrangement of claim 40, wherein the upper surface is radially intermediate the first and third packing and the first and third packing when compressed by system pressure provide seals that at least assist in the maintenance of the ambient pressure on the upper surface.

42. The arrangement of claim 41, wherein said gland assembly includes
an annular collet piston slidable along the shaft and defining said gland assembly aperture and upper surface,
an annular pressure plate situated generally below the collet piston and defining at least some of the gland assembly lower surface, for urging the collet piston along the shaft upon system pressurization.

43. The arrangement of claim 42, wherein the pressure plate includes inner and outer annular rims slidingly engaged with complementary grooves in the collet piston, a pair of concentric annular packings are located between respective rims and grooves, for maintaining a portion of the upper surface of the pressure plate at ambient pressure, the outer of said concentric packings consisting of said third packing.

44. The arrangement of claim 42, wherein the collet piston includes nested relatively slidable upper and lower segments, the upper segment defining the upper surface and the aperture of the gland assembly, the lower segment interposed between the pressure plate and the upper segment, and the third packing being interposed between the upper and lower segments.

45. The arrangement of claim 44, wherein the pressure plate includes inner and outer annular rims slidingly engaged with complementary grooves in the collet piston lower segment, a pair of concentric annular fourth and fifth packings are located between respective rims and grooves, for maintaining a portion of the upper surface of the pressure plate at ambient pressure.

46. The arrangement of claim 45, wherein the bonnet assembly includes an annular shoulder supported by the housing and projecting inwardly toward but spaced from the shaft, below the pressure plate, and wherein the means for compressing the first packing includes spring means interposed between the annular shoulder and the pressure plate.

47. The arrangement of claim 40, wherein said means for compressing the first packing includes means for compressing the third packing.

48. The arrangement of claim 39 wherein said means for compressing the first packing means include a post passing freely through the bonnet assembly and biased upwardly relative thereto, connected at its lower end to the gland assembly.

49. The arrangement of claim 39 wherein
the bonnet assembly includes an annular cavity having inner and outer walls concentric with the shaft,
the gland assembly includes a gland plate defining the gland assembly aperture, a pair of upper and lower collars concentric with the shaft and located within the cavity above the gland plate, the upper collar defining said upper surface and additional packing means compressed between the upper and lower collars, the additional packing means being further compressed by system pressure,
said means for compressing the first packing between the bonnet assembly and the gland assembly includes means operatively connecting the gland plate, the collars, and the bonnet assembly.

50. The arrangement of claim 49, wherein said means for compressing include a plurality of posts passing through the gland plate, the collars, and the bonnet assembly, the lower end of each post adapted for vertically supporting the gland plate and the other end including means for drawing the gland plate and the collars toward the bonnet assembly.

51. The arrangement of claim 50 including mean passing through the gland plate, the collars and the bonnet assembly, for drawing the lower collar and gland plate toward the upper collar, thereby compressing the additional packing means.

52. The arrangement of claim 51 wherein the means for drawing the lower collar includes a plurality of posts.

53. The arrangement of claim 50, wherein the additional packing means include,
a third packing concentric with the shaft and in contact with the cavity outer wall;
a fourth packing concentric with the shaft and in contact with the cavity inner wall;
a plurality of local packing rings situated radially between the third and fourth packing and concentric with the respective plurality of posts.

54. The arrangement of claim 53 wherein a portion of the upper surface of the lower collar is maintained at ambient pressure and the lower surface of the lower collar is exposed to the system pressure.

55. The arrangement of claim 53, wherein said operative relation between the collars and the pressure plate includes means for biasing the lower collar away from the pressure plate.

56. The arrangement of claim 39 wherein the bonnet assembly has a plurality of holes defined by cylindrical wall means symmetrically located relative to the shaft, the gland assembly includes a pressure plate defining said gland assembly aperture, a plurality of substantially cylindrical steel member located in said holes above the pressure plate, each steel member having an upper and lower section, additional packing means between the upper and lower sections, and means operatively connecting together the bonnet assembly, the upper and lower sections, and the pressure plate.

57. The arrangement of claim 56, wherein a portion of the upper side of the long section defines said upper surface, and a portion of the lower side of the lower section defines said lower surface.

58. The arrangement of claim 57, wherein the means for operatively connecting together includes,
means for limiting the downward movement of the upper section relative to the bonnet assembly, while permitting upward movement,
means for drawing the pressure plate and lower section toward the upper section, in order to compress the additional packing means, and
means for biasing the lower section and the pressure plate apart.

59. The arrangement of claim 39, wherein the housing extends transversely to the shaft.

60. The arrangement of claim 39, wherein the second packing is positioned between the housing and the gland assembly, and is compressible by the sliding gland assembly upon system pressurization.

61. The arrangement of claim 60, wherein said means for compressing the first packing includes means for compressing the second packing.

* * * * *